(12) United States Patent
Yagi et al.

(10) Patent No.: US 10,376,864 B2
(45) Date of Patent: Aug. 13, 2019

(54) CARRIER FOR SYNTHESIS GAS PRODUCTION CATALYST, METHOD OF MANUFACTURING THE SAME, SYNTHESIS GAS PRODUCTION CATALYST, METHOD OF MANUFACTURING THE SAME AND METHOD OF PRODUCING SYNTHESIS GAS

(71) Applicant: CHIYODA CORPORATION, Yokohama-shi, Kanagawa (JP)

(72) Inventors: Fuyuki Yagi, Yokohama (JP); Atsuro Nagumo, Yokohama (JP); Ryuichi Kanai, Yokohama (JP)

(73) Assignee: CHIYODA CORPORATION, Yokohama-shi (JP)

( * ) Notice: Subject to any disclaimer, the term of this patent is extended or adjusted under 35 U.S.C. 154(b) by 0 days.

(21) Appl. No.: 15/755,901

(22) PCT Filed: Jun. 5, 2017

(86) PCT No.: PCT/JP2017/020835
§ 371 (c)(1),
(2) Date: Feb. 27, 2018

(87) PCT Pub. No.: WO2017/213090
PCT Pub. Date: Dec. 14, 2017

(65) Prior Publication Data
US 2019/0030515 A1    Jan. 31, 2019

(30) Foreign Application Priority Data
Jun. 10, 2016 (JP) .................................. 2016-116202

(51) Int. Cl.
*B01J 23/02* (2006.01)
*B01J 23/46* (2006.01)
(Continued)

(52) U.S. Cl.
CPC .............. *B01J 23/464* (2013.01); *B01J 23/02* (2013.01); *B01J 23/462* (2013.01); *B01J 23/58* (2013.01);
(Continued)

(58) Field of Classification Search
CPC ........ B01J 23/02; B01J 23/462; B01J 23/464; B01J 23/58; B01J 35/1009; B01J 21/10
See application file for complete search history.

(56) References Cited

U.S. PATENT DOCUMENTS 6,312,660 B1    11/2001  Yagi et al.
6,340,437 B1     1/2002  Yagi et al.
(Continued)

FOREIGN PATENT DOCUMENTS

CN    1254323 A     5/2000
CN  101808737 A     8/2010
(Continued)

OTHER PUBLICATIONS

English translation of Search Report dated Sep. 25, 2018, issued in counterpart Chinese Application No. 201780002255.3. (5 pages).
(Continued)

*Primary Examiner* — Cam N. Nguyen
(74) *Attorney, Agent, or Firm* — Westerman, Hattori, Daniels & Adrian, LLP

(57) ABSTRACT

This invention provides a carrier for a synthesis gas production catalyst that can suppress carbon depositions and allows to efficiently produce synthesis gas on a stable basis for a long duration of time when producing synthesis gas by carbon dioxide reforming. It is a carrier to be used for producing synthesis gas containing carbon monoxide and hydrogen from source gas containing methane-containing light hydrocarbons and carbon dioxide. The carrier contains magnesium oxide grains and calcium oxide existing on the (Continued)

surfaces of magnesium oxide grains. The calcium oxide content thereof is between 0.005 mass % and 1.5 mass % in terms of Ca.

9 Claims, 5 Drawing Sheets

(51) Int. Cl.
*B01J 23/58* (2006.01)
*B01J 35/10* (2006.01)
*B01J 21/10* (2006.01)
*B01J 37/08* (2006.01)
*B01J 32/00* (2006.01)
*C01B 3/40* (2006.01)
*C01B 32/40* (2017.01)
*B01J 37/02* (2006.01)

(52) U.S. Cl.
CPC ........... *B01J 32/00* (2013.01); *B01J 35/1009* (2013.01); *B01J 37/0221* (2013.01); *B01J 37/08* (2013.01); *C01B 3/40* (2013.01); *C01B 32/40* (2017.08); *C01B 2203/0233* (2013.01); *C01B 2203/0238* (2013.01); *C01B 2203/1064* (2013.01); *C01B 2203/1082* (2013.01); *C01B 2203/1241* (2013.01); *Y02P 20/52* (2015.11)

(56) References Cited

U.S. PATENT DOCUMENTS

| | | | | |
|---|---|---|---|---|
| 6,780,386 B1 * | 8/2004 | Fukunaga | ............... | B01J 23/462 423/212 |
| 8,071,655 B2 * | 12/2011 | Diehl | ............ | B01J 21/12 518/715 |
| 8,207,327 B2 * | 6/2012 | Laar | ............ | B01J 21/08 502/242 |
| 8,273,681 B2 * | 9/2012 | Naito | .............. | B01D 53/945 502/302 |
| 8,802,904 B2 * | 8/2014 | Johnston | ............ | B01J 23/626 568/885 |
| 9,180,433 B2 * | 11/2015 | Wang | ............ | B01J 23/58 |
| 2001/0010808 A1 | 8/2001 | Yagi et al. | | |
| 2004/0209772 A1 * | 10/2004 | Fukunaga | ............. | B01J 23/462 502/332 |
| 2008/0241039 A1 * | 10/2008 | Fukunaga | ............. | B01J 23/462 423/247 |
| 2010/0207070 A1 | 8/2010 | Nagaoka et al. | | |

FOREIGN PATENT DOCUMENTS

| | | |
|---|---|---|
| JP | 6-279003 A | 10/1994 |
| JP | 9-131533 A | 5/1997 |
| JP | 9-168740 A | 6/1997 |
| JP | 11-157804 | 6/1999 |
| JP | 3345782 B2 | 11/2002 |
| JP | 2008-279337 A | 11/2008 |
| JP | 2009-66520 A | 4/2009 |
| JP | 2010-22983 A | 2/2010 |
| JP | 6131370 B1 | 5/2017 |
| WO | 2009/048083 A1 | 4/2009 |

OTHER PUBLICATIONS

Notification of Transmittal of Translation of the International Preliminary Report on Patentability (Form PCT/IB/338) issued in counterpart International Application No. PCT/JP2017/020835 dated Dec. 20, 2018, with Forms PCT/IB/373, PCT/IB/326 and PCT/ISA/237. (15 pages).
Extended (supplementary) European Search Report dated May 11, 2018, issued in counterpart European Application No. 17793820.6. (11 pages).
International Search Report dated Jul. 18, 2017, issued in counterpart International Application No. PCT/JP2017/020835 (2 pages).
Written Opinion dated Jul. 18, 2017, issued in counterpart International Application No. PCT/JP2017/020835 in Japanese (5 pages).
Notification of Reasons for Refusal dated Jan. 17, 2017, issued in counterpart Japanese Patent Application No. 2016-116202, w/English translation (6 pages).
Decision to Grant a Patent dated Apr. 4, 2017, issued in counterpart Japanese Patent Application No. 2016-116202, w/ English translation (6 pages).
"New technology for the manufacture of synthesis gas and metal zinc using reduction of zinc oxide by methane", edited by Wang Hua et al., published by Metallurgical Industry Publisher; cited in Chinese Office Action dated Sep. 25, 2018. (2 pages).
Office Action dated Sep. 25, 2018, issued in counterpart Chinese Application No. 201780002255.3. (6 pages).

* cited by examiner

US 10,376,864 B2

CARRIER FOR SYNTHESIS GAS PRODUCTION CATALYST, METHOD OF MANUFACTURING THE SAME, SYNTHESIS GAS PRODUCTION CATALYST, METHOD OF MANUFACTURING THE SAME AND METHOD OF PRODUCING SYNTHESIS GAS

TECHNICAL FIELD

The present invention relates to a carrier for a synthesis gas production catalyst to be used for producing synthesis gas, a method of manufacturing such a carrier, a synthesis gas production catalyst, a method of manufacturing such a catalyst and a synthesis gas production method.

BACKGROUND ART

Synthesis gases containing carbon monoxide and hydrogen as principal ingredients are being widely utilized as source materials for producing dimethyl ether, methanol, Fischer-Tropsch oil, acetic acid, diphenymethane diisocyanate, methyl methacrylate and so on. Techniques for producing such synthesis gases include, for example, carbon dioxide reforming of causing methane-containing light hydrocarbons and carbon dioxide to react with each other in the presence of a catalyst, steam reforming of causing light hydrocarbons containing methane etc. and steam to react with each other in the presence of a catalyst and carbon dioxide/steam reforming of causing light hydrocarbons containing methane etc., carbon dioxide and steam to react with one another in the presence of a catalyst.

Carbon dioxide reforming and carbon dioxide/steam reforming are accompanied by a problem of causing a side reaction of carbon deposition to take place due to the source materials of light hydrocarbons and the reforming product of carbon monoxide. A phenomenon of catalyst poisoning occurs as carbon deposits on the catalyst to damage the catalytic activity and reduce the reaction rate. With either of these techniques, therefore, it is difficult to efficiently produce synthesis gas on a stable basis for a long duration of time. Additionally, carbon deposition can cause a rise of pressure difference and blockage to occur in the reforming reactor.

To cope with the problem of carbon deposition, there have been disclosed a carbon dioxide reforming catalyst prepared by causing a carrier made of at least one or more of alkaline earth metal oxides and aluminum oxide to carry a ruthenium compound (see PTL 1 listed below), a carbon dioxide reforming catalyst prepared by causing a carrier made of an oxide of Groups II through IV metals or an oxide of lanthanoid metals or a carrier made of an alumina complex containing an oxide of such metals to carry rhodium (see PTL 2 listed below) and a synthesis gas production catalyst prepared by causing a carrier made of a metal oxide to carry at least a catalyst metal selected from rhodium, ruthenium, iridium, palladium and platinum and showing a specific surface area of not greater than 25 m²/g, an electronegativity of the metal ions in the carrier metal oxide of not greater than 13.0 and a catalyst metal carrying rate between 0.0005 and 0.1 mol % relative to the carrier metal oxide in terms of metal (see PTL 3).

However, there is still a demand for catalysts that can further suppress carbon deposition and operate to efficiently produce synthesis gas on a stable basis for a long duration of time.

Additionally, with carbon dioxide/steam reforming, the ratio of the source gas and the produced synthesis gas changes as a function of the abundance ratio of carbon dioxide to hydrocarbons, or $CO_2/C$, and that of steam to hydrocarbons, or $H_2O/C$, in the source gas. FIG. 1 shows the relationship between the abundance ratio (molar ratio) of carbon dioxide ($CO_2$) and steam ($H_2O$) to carbon (C) and the ratio (volume ratio) of the source gas to the produced synthesis gas. From the viewpoint of synthesis efficiency, it is desirable to conduct a reforming operation with a $CO_2/C$ ratio and a $H_2O/C$ ratio that minimize the ratio of the source gas to the produced synthesis gas. This is because such an arrangement can provide advantages of downsizing the reformer apparatus and reducing the running cost (the quantity of the source gas) among others.

However, with a $CO_2/C$ ratio and an $H_2O/C$ ratio that minimize the ratio of the source gas to the produced synthesis gas, carbon can deposit on the catalyst surface to a large extent to make it difficult to effectively conduct carbon dioxide/steam reforming operations.

CITATION LIST

Patent Literature

PTL 1: Japanese Patent Application Laid-Open No. 06-279003

PTL 2: Japanese Patent Application Laid-Open No. 09-168740

PTL 3: Japanese Patent No. 3,345,782

SUMMARY OF INVENTION

Technical Problem

In view of the above-identified problems, therefore, the object of the present invention is to provide a carrier for a synthesis gas production catalyst that can suppress carbon depositions and operate to efficiently produce synthesis gas on a stable basis for a long duration of time, a method of manufacturing such a carrier, a synthesis gas production catalyst, a method of manufacturing such a catalyst and a synthesis gas production method using such a synthesis gas production catalyst.

Solution to Problem

As a result of intensive research efforts, the inventors of the present invention found that the above object can be achieved by using a carrier for a synthesis gas production catalyst that contains magnesium oxide grains and calcium oxide existing on the surfaces of the magnesium oxide grains and shows a calcium oxide content between 0.005 mass % and 1.5 mass % in terms of Ca to complete the present invention.

A carrier for a synthesis gas production catalyst according to the present invention is to be used for producing synthesis gas containing carbon monoxide and hydrogen from source gas containing methane-containing light hydrocarbons and carbon dioxide and characterized in that the carrier contains magnesium oxide grains and calcium oxide existing on the surfaces of the magnesium oxide grains and shows a calcium oxide content between 0.005 mass % and 1.5 mass % in terms of Ca.

Preferably, the calcium oxide exists on the surfaces of the magnesium oxide grains by 0.05 mg-Ca/m²-MgO to 150 mg-Ca/m²-MgO in terms of Ca. Note that the value expressed by the unit of "mg-Ca/m²-MgO" represents the quantity as expressed in terms of mg of the existing calcium per unit surface area (1 m$^2$) of the magnesium oxide grains comprised in the carrier for the synthesis gas production catalyst, which is equal to the value obtained by dividing the calcium content (mg/g) in the carrier by the specific surface area (m$^2$/g) of the carrier.

Preferably, the calcium oxide exists within 10% of the depth from the surface of the carrier for the synthesis gas production catalyst. In other words, preferably, the calcium oxide exists in a region of which depth is within 10% of the maximum depth (the maximum length between the center of gravity and the surface) in each of the magnesium oxide grains comprised in the carrier for the synthesis gas production catalyst.

Preferably, the magnesium oxide grains have a calcium oxide-containing layer formed on the surfaces thereof.

A method of manufacturing a carrier for a synthesis gas production catalyst according to the present invention is a method for manufacturing such a carrier for a synthesis gas production catalyst to be used for producing synthesis gas containing carbon monoxide and hydrogen from source gas containing methane-containing light hydrocarbons and carbon dioxide, characterized in that a carrier for a synthesis gas production catalyst containing magnesium oxide grains and calcium oxide existing on the surfaces of the magnesium oxide grains and showings a calcium oxide content between 0.005 mass % and 1.5 mass % in terms of Ca is obtained by baking calcium oxide-containing source magnesium oxide particles at not lower than 1,000° C., causing the source magnesium oxide particles to agglomerate to form magnesium oxide grains and causing calcium oxide to precipitate on the surfaces of the magnesium oxide grains.

Preferably, carbon is added to the source magnesium oxide particles within the range between 1 mass % and 5 mass % relative to the source magnesium oxide particles and subsequently the source magnesium oxide particles are baked.

Preferably, the calcium oxide exists on the surfaces of the magnesium oxide grains within the range between 0.05 mg-Ca/m$^2$-MgO and 150 mg-Ca/m$^2$-MgO in terms of Ca in the carrier for the synthesis gas production catalyst.

Preferably, in a carrier for a synthesis gas production catalyst as defined above, the calcium oxide exists within 10% of the depth from the surface of the carrier for the synthesis gas production catalyst.

A synthesis gas production catalyst according to the present invention is characterized in that at least either one of the metals of ruthenium and rhodium is carried on the carrier for the synthesis gas production catalyst according to the present invention as defined above.

Preferably, the metal is carried by the carrier within the range between 200 mass ppm and 2,000 mass ppm relative to the synthesis gas production catalyst in terms of metal.

Preferably, the metal exists in the vicinity of the calcium oxide on the surfaces of the magnesium oxide grains.

Preferably, the metal exists within 10% of the depth from the surface of the synthesis gas production catalyst.

Preferably, the specific surface area of the synthesis gas production catalyst is between 0.1 m$^2$/g and 1.0 m$^2$/g.

The magnesium oxide grains may have a calcium oxide-containing layer containing calcium oxide and a metal-containing layer containing the above-identified metal on the surfaces thereof.

Metal particles containing the above-identified metal may exist on the surfaces of the magnesium oxide grains.

A method of manufacturing a synthesis gas production catalyst according to the present invention is characterized in that the carrier for the synthesis gas production catalyst according to the present invention as defined above is caused to carry at least either one of the metals of ruthenium or rhodium by using an aqueous solution of the metal.

Preferably, the carrier is caused to carry the metal by spraying the aqueous solution of the metal onto the carrier for the synthesis gas production catalyst.

A method of producing synthesis gas according to the present invention is characterized in that synthesis gas containing carbon monoxide and hydrogen is produced from source gas containing methane-containing light hydrocarbons and carbon dioxide in the presence of the synthesis gas production catalyst according to the present invention as defined above.

Preferably, the source gas is caused to flow to a catalyst layer filled with the synthesis gas production catalyst so as to make the abundance ratio of carbon dioxide to light hydrocarbons in the source gas, or CO$_2$/C (CO$_2$ representing the number of moles of carbon dioxide molecules, C representing the number of moles of carbon atoms derived from light hydrocarbons), to be found within the range between 0.4 and 1.0, the gas temperature at the outlet of the catalyst layer to be found between 700 and 900° C., the gas pressure at the outlet of the catalyst layer to be found between 1.5 MPaG and 3.0 MPaG and the gas hourly space velocity GHSV to be found between 500/hour and 5,000/hour.

The source gas may additionally contain steam.

Advantageous Effects of Invention

Carbon deposition can remarkably be suppressed in reforming operations such as carbon dioxide reforming operations and carbon dioxide/steam reforming operations by conducting the reforming operation in the presence of a synthesis gas production catalyst using a carrier for a synthesis gas production catalyst according to the present invention so as to make it possible to efficiently produce synthesis gas on a stable basis for a long duration of time.

DESCRIPTION OF EMBODIMENTS

A carrier for a synthesis gas production catalyst according to the present invention is a carrier to be used for producing synthesis gas containing carbon monoxide and hydrogen from source gas containing methane-containing light hydrocarbons and carbon dioxide. A carrier for a synthesis gas production catalyst according to the present invention contains magnesium oxide grains and calcium oxide existing on the surfaces of the magnesium oxide grains and shows a calcium oxide content between 0.005 mass % and 1.5 mass % in terms of Ca.

Figure 1:
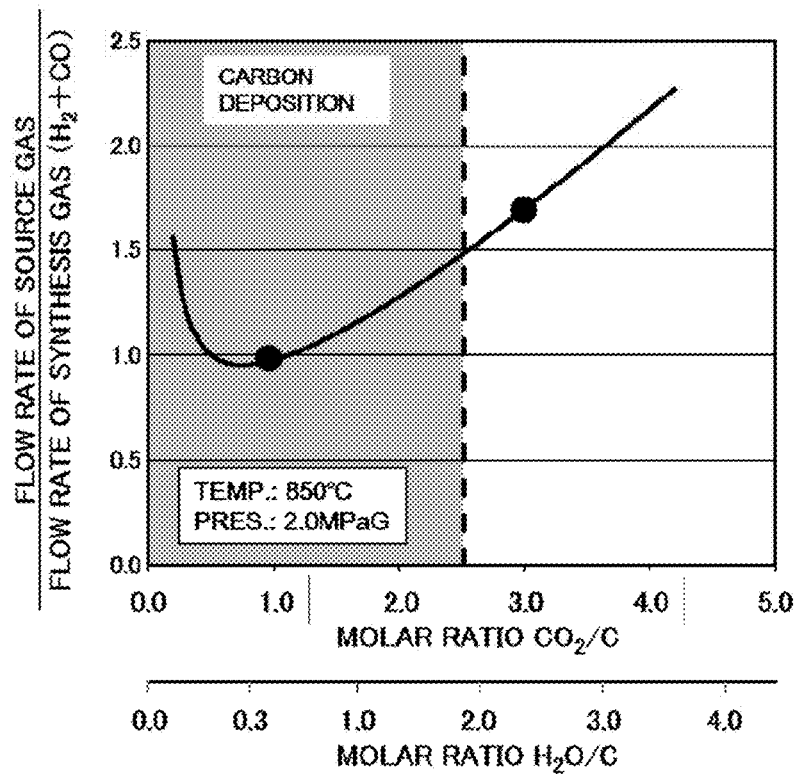
FIG. 1 is a graph showing the relationship between the abundance ratio (molar ratio) of carbon dioxide or steam to carbon and the ratio (volume ratio) of the source gas to the produced synthesis gas for carbon dioxide/steam reforming.
Figure 2:
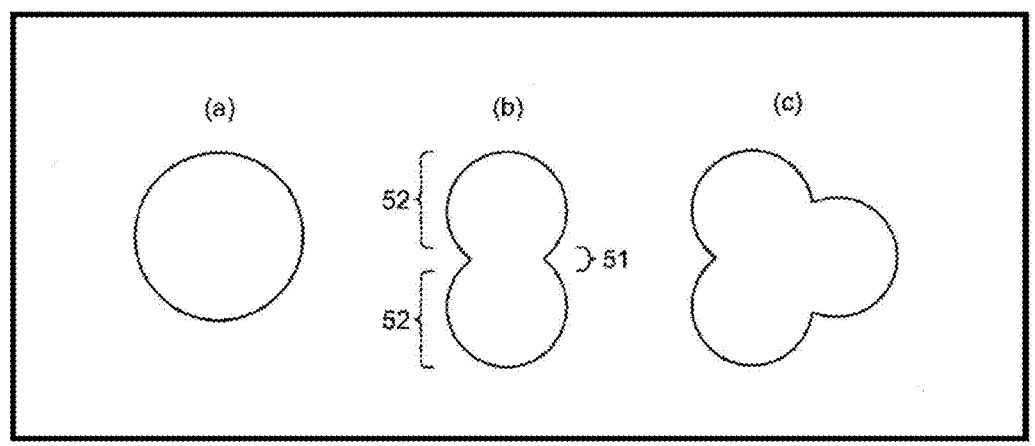
FIG. 2 is a schematic illustration of exemplar cross-sectional views of magnesium oxide grains comprised in a carrier for a synthesis gas production catalyst according to the present invention.

The form of magnesium oxide grains to be used for the purpose of the present invention is not subjected to any particular limitations. In other words, magnesium oxide grains may exist as separate individual particles or a plurality of particles may be agglomerated for use. FIG. 2 is a schematic illustration of exemplar cross-sectional views of magnesium oxide grains comprised in a carrier for a synthesis gas production catalyst according to the present invention. As shown in FIG. 2, a plurality of source magnesium oxide particles may be agglomerated and fused to show a globular form (a) or two source magnesium oxide particles may be put together to show a peanut shell-like form having a center part 51 and two opposite end parts 52 having a diameter greater than the center part 51 (b). Alternatively, three source magnesium oxide particles may be put together (c). Note here that magnesium oxide grains need to be used for the purpose of the present invention. In other words, the advantages of the present invention cannot be obtained by using oxide of some other metal such as zirconium oxide ($ZrO_2$) or alumina ($Al_2O_3$).

Figure 3:
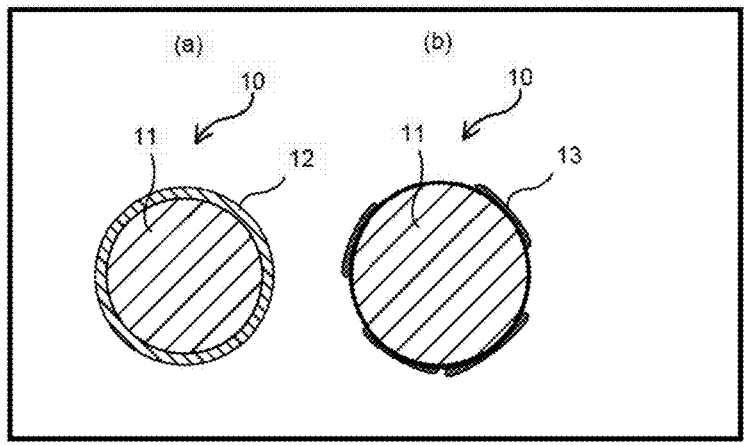
FIG. 3 is a schematic illustration of calcium oxide existing on the surfaces of magnesium oxide grains comprised in a carrier for a synthesis gas production catalyst according to the present invention.

For the purpose of the present invention, the mode of existence of calcium oxide (CaO) on the surfaces of magnesium oxide (MgO) grains is not subjected to any particular limitations. For example, the entire surface or part of the surface of magnesium oxide grain may be covered by a calcium oxide-containing layer. Note that the calcium oxide-containing layer formed on the surface of magnesium oxide grain may contain magnesium oxide. Alternatively, calcium oxide may be unevenly and locally distributed on the surface of magnesium oxide grain. More specifically, for example, calcium oxide may exist in one or more than one recesses on the surface of magnesium oxide grain. FIG. 3 is a schematic illustration of different forms of existence of calcium oxide on the surface of magnesium oxide grain comprised in a carrier for a synthesis gas production catalyst according to the present invention. As shown in FIG. 3, a carrier 10 for a synthesis gas production catalyst according to the present invention may be such that a calcium oxide-containing layer 2 is formed on the entire surface of magnesium oxide grain 11 (a) or a calcium oxide layer 13 is formed on part of the surface of magnesium oxide grain 11 (b). Alternatively, a calcium oxide layer may locally exist in one or more than one recesses on the surface of magnesium oxide grain.

As described above, a carrier for a synthesis gas production catalyst according to the present invention contains magnesium oxide grains and calcium oxide existing on the surfaces of the magnesium oxide grains. The content of calcium oxide existing on the surfaces of the magnesium oxide grains is between 0.005 mass % and 1.5 mass %, preferably between 0.3 mass % and 1.4 mass % in terms of Ca. With such an arrangement, carbon deposition can remarkably be suppressed in reforming operations such as carbon dioxide reforming operations and carbon dioxide/steam reforming operations to make it possible to efficiently produce synthesis gas on a stable basis for a long duration of time. When the content of calcium oxide existing on the surfaces of the magnesium oxide grains in terms of Ca is less than 0.005 mass %, carbon deposition can easily take place on the surface of the catalyst. When, on the other hand, the content of calcium oxide existing on the surfaces of the magnesium oxide grains in terms of Ca is more than 1.5 mass %, the catalyst shows a poor catalytic activity to make it impossible to obtain the advantages of the present invention.

The content of calcium oxide existing on the surfaces of the magnesium oxide grains in terms of Ca can be determined by a technique as described below. Namely, the overall content of calcium oxide existing in the magnesium oxide grains in terms of Ca can be determined by dissolving a sample (of the carrier for the synthesis gas catalyst) in aqua regia and observing it by means of an ICP emission spectrometer. At this time, the quantity of Ca quantitatively determined by means of the ICP emission spectrometer can be used as the content of calcium oxide existing on the surfaces of the magnesium oxide grains in terms of Ca by analyzing the distribution of Ca existing in the magnesium oxide grains by EPMA (electron probe microanalysis) and verifying that no Ca exists in the inside of the magnesium oxide grains and substantially all the Ca exists on the surfaces of the magnesium oxide grains also by EPMA.

Preferably, in a carrier for a synthesis gas production catalyst according to the present invention, calcium oxide exists on the surfaces of the magnesium oxide grains by 0.05 mg-Ca/$m^2$-MgO to 150 mg-Ca/$m^2$-MgO in terms of Ca. As described earlier, the content of calcium oxide existing on the surfaces of the magnesium oxide grains in terms of Ca (mg-Ca/$m^2$-MgO) can be determined by dividing the quantity of calcium oxide existing on the surfaces of the magnesium oxide grains per 1 g of magnesium oxide grains in terms of Ca (unit: mg-Ca/g) by the specific surface area of the carrier for the synthesis gas production catalyst (unit: $m^2$/g)

Preferably, calcium oxide exists within 10% of the depth from the surface of the carrier 10 for the synthesis gas production catalyst. The expression of "within 10% of the depth from the surface of the carrier for the synthesis gas production catalyst" as used herein refers to a region of which depth is within 10% of the maximum depth (the maximum length between the center of gravity and the surface) in each of the magnesium oxide grains comprised in the carrier for the synthesis gas production catalyst, as stated above. To be more accurate, when the largest distance between the center of gravity and the surface of a magnesium oxide grain comprised in the carrier for the synthesis gas production catalyst is expressed as the radius of the grain, or $r_1$, the above expression refers to a depth from the surface of not more than $r_1/10$ toward the center of gravity of the grain.

The size, or the diameter, of magnesium oxide grain comprised in the carrier for the synthesis gas production catalyst is typically maximally between 0.1 and 10 μm, although the size is by no means subjected to any particular limitations. The thickness of the calcium oxide-containing layer is typically between 5 and 70 nm.

The carrier for the synthesis gas production catalyst may typically be ring-shaped, multi-hole-shaped, tablet-shaped or pellet-shaped.

A carrier for a synthesis gas production catalyst according to the present invention can be manufactured, for example, by baking calcium oxide-containing source magnesium oxide powder (particles) at not lower than 1,000° C., causing the source magnesium oxide particles to agglomerate to form magnesium oxide grains and also causing calcium oxide to precipitate on the surfaces of the magnesium oxide grains.

Calcium oxide-containing source magnesium oxide particles are employed for the above-described manufacturing method. The content of calcium oxide contained in the source magnesium oxide particles is between 0.005 mass % and 1.5 mass %, preferably between 0.3 mass % and 1.4 mass %. The expression of "calcium oxide-containing source magnesium oxide particles" refers to that the source magnesium oxide particles to be used as source material uniformly contain calcium oxide in the inside thereof within the range between 0.005 mass % and 1.5 mass %. In other words, highly pure magnesium oxide such as normally commercially available magnesium oxide contains calcium oxide only to a lesser extent so that such magnesium oxide cannot be used as source magnesium oxide particles for the purpose of the present invention.

If necessary, calcium oxide-containing source magnesium oxide particles as described above are molded so as to show a desired profile as a carrier for a catalyst, which may typically be ring-shaped, multi-hole-shaped, tablet-shaped or pellet-shaped.

When the calcium oxide-containing source magnesium oxide particles are molded to show a desired profile, a lubricant such as carbon may be added to them. For example, carbon is preferably added to the source magnesium oxide particles within the range between 1 mass % and 5 mass %.

A carrier for a synthesis gas production catalyst according to the present invention can be manufactured by baking the calcium oxide-containing source magnesium oxide particles, which may have been molded to show a desired profile if necessary, at not lower than 1,000° C., causing the source magnesium oxide particles to agglomerate to form magnesium oxide grains and also causing calcium oxide to precipitate on the surfaces of the magnesium oxide grains 11.

As source magnesium oxide particles are baked under specific conditions, which will be described hereinafter, the source magnesium oxide particles are caused to agglomerate to form magnesium oxide grains. Additionally, as the source magnesium oxide particles are baked under the specific conditions, the calcium oxide existing in the inside of the source magnesium oxide particles are forced to come out and precipitate on the surfaces of the magnesium oxide grains. Then, the calcium oxide eventually forms a calcium oxide-containing layer on the surfaces of the magnesium oxide grains or comes to locally exist in recesses on the surfaces of the magnesium oxide grains.

When the source magnesium oxide particles contain calcium oxide only to a small extent, calcium oxide precipitates only insufficiently on the surfaces of the grains to make it impossible to obtain the advantage of the present invention of suppressing carbon deposition.

Additionally, note that the baking temperature needs to be not lower than 1,000° C. When the baking temperature is lower than the above-identified temperature level, calcium oxide existing in the insides of the source magnesium oxide particles would not come out to precipitate on the surfaces of the magnesium oxide grains to make it impossible to obtain the advantages of the present invention. Preferably, the baking temperature is not higher than 1,400° C.

A carrier for a synthesis gas production catalyst according to the present invention can be manufactured by a method other than the above-described one. More specifically, Ca-added type $Mg(OH)_2$ particles are obtained by boiling high purity magnesium oxide (for example, MgO containing CaO by not more than 0.01 mass % in terms of Ca and showing a purity of not less than 99.9 mass %) at temperature between 60 and 80° C., while agitating it, and at the same time dropping aqueous solution of $Ca(OH)_2$ and agitating it. Ca-added type $Mg(OH)_2$ particles obtained in this way substantially uniformly contain CaO in the inside thereof. Then, a carrier for a synthesis gas production catalyst according to the present invention can be manufactured by baking the obtained Ca-added type $Mg(OH)_2$ particles, if necessary adding a lubricant and molding the particles thereto, at temperature not lower than 1,000° C. and preferably not higher than 1,400° C. so as to cause the Ca-added type $Mg(OH)_2$ particles to agglomerate and turn into magnesium oxide grains and, at the same time to cause calcium oxide to precipitate on the surfaces of the magnesium oxide grains just as in the instance of using the above-described manufacturing method according to the present invention.

Neither of the above-described manufacturing methods basically involves any operation of adding calcium oxide to the source magnesium oxide particles.

Note here that if the source magnesium oxide particles or the Ca-added type $Mg(OH)_2$ particles agglomerate or not, if calcium oxide precipitates on the surfaces of the produced magnesium oxide grains or not and when and to what extent such agglomeration and precipitation take place vary depending on the conditions under which the source magnesium oxide particles, the Ca-added type $Mg(OH)_2$ particles or the molded body thereof is baked. More specifically, the above conditions include the calcium oxide content of the source magnesium oxide particles, the Ca-added type $Mo(OH)$ particles, the baking temperature, the baking atmosphere, the baking time, the type and the rate of addition of the additive or each of the additives including the lubricant and the size and the shape of the molded body to be baked, if such a molded body is used, of the source magnesium oxide particles or the Ca-added type $Mg(OH)_2$ particles. Therefore, the above-identified baking conditions need to be adjusted in an coordinated manner for the purpose of forming magnesium oxide grains by causing the source magnesium oxide particles or the Ca-added type $Mg(OH)_2$ to agglomerate and also causing calcium oxide to precipitate on the surfaces of the magnesium oxide grains to form calcium oxide-containing layers on the surfaces of the magnesium oxide grains.

A synthesis gas production catalyst according to the present invention is at least either of the metals of ruthenium (Ru) and Rhodium (Rh) that is carried by a carrier for a synthesis gas production catalyst according to the present invention as defined above. In other words, for a synthesis gas production catalyst according to the present invention, the metal to be carried by a carrier needs to be at least either Ru or Rh. Differently stated, the advantages of the present invention cannot be obtained by causing any other metal such as Ni, Ir or Os to be carried by a carrier.

The rate at which either Ru or Rh is carried by a carrier for the purpose of the present invention is preferably between 200 mass ppm and 2,000 mass ppm relative to the carrier for a synthesis gas production catalyst in terms of metal. When both Ru and Rh are to be carried by a carrier, they are preferably carried in combination at a rate between 200 mass ppm and 2,000 mass ppm. The rate at which Ru or Rh is carried by a carrier can be determined by means of an ICP emission spectrometer. More specifically, it can be quantified by dissolving a sample of the catalyst in aqua regia and irradiating it with light of a predetermined measurement wavelength.

Preferably, the specific surface area of a synthesis gas production catalyst according to the present invention is between 0.1 $m^2$/g and 1.0 $m^2$/g. For the purpose of the present invention, "the specific surface area" refers to the BET specific surface area determined by means of the BET adsorption isotherm on the basis of the rate of nitrogen gas adsorption. For instance, such a specific surface area can be determined by means of a specific surface area measurement device (e.g., "AUTOSORB-1": tradename, available from Yuasa Ionics) for multi-point measurement using liquid nitrogen.

Ru and/or Rh to be carried by a synthesis gas production catalyst preferably exist within 10% of the depth from the surface of the synthesis gas production catalyst. As for the expression of "within 10% of the depth from the surface of the synthesis gas production catalyst", when the largest distance between the center of gravity and the surface of the synthesis gas production catalyst is expressed as radius $r_2$, the above expression refers to a position separated from the surface by not more than $r_2/10$ toward the center of gravity as in the above-described case of a carrier for a synthesis gas production catalyst.

For the purpose of the present invention, the mode of existence of Ru and/or Rh to be carried by a carrier for a synthesis gas production catalyst according to the present invention is not subjected to any particular limitations. Ru and/or Rh preferably exist in the vicinity of calcium oxide on the surfaces of the magnesium oxide grains. Like the calcium oxide layer, a metal-containing layer containing at least either Ru or Rh may cover the entire surface or part of the surface of magnesium oxide grain. Alternatively, metal particles containing Ru and/or Rh may simply exist on the surface of magnesium oxide grain. Furthermore, Ru and/or Rh may be unevenly and locally distributed on the surface of magnesium oxide grain. More specifically, for example, Ru and/or Rh may exist in one or more than one recesses on the surface of a magnesium oxide grain or Ru and/or Rh may exist in the form of a layer or grains so as to cover at least part of the calcium oxide layer. Alternatively, Ru and/or Rh existing in the form of a layer or grains and calcium oxide existing in the form of a layer or grains may be located side by side. For example, a metal-containing layer may be formed on or under a calcium oxide layer or, alternatively, a metal layer and a calcium oxide layer may be located side by side.

The size, or the diameter, of magnesium oxide grains comprised in a synthesis gas production catalyst is typically maximally between 1 and 10 μm. For the purpose of the present invention, the thickness of a calcium oxide-containing layer is typically between 5 and 70 μm and the thickness of a metal-containing layer is also typically between 5 and 70 μm.

Methods that can be used for causing a carrier for a synthesis gas production catalyst to carry at least either of the metals of Ru and Rh include a method of using aqueous solution of at least either of the metals of Ru and Rh and spraying the aqueous solution onto a carrier for a synthesis gas production catalyst. Aqueous solution of at least either of the metals of Ru and Rh can be obtained by dissolving a source metal material such as nitrate, chloride or some other inorganic salt of Ru and/or Rh or acetate or some other organic salt of Ru and/or Rh into water. The amount of such aqueous solution to be sprayed is preferably 1.0 to 1.3 times of the mass of water that a carrier for a synthesis gas production catalyst can absorb. Note that the amount of water that a carrier for a synthesis gas production catalyst can absorb can be determined by an incipient-wetness method. With such a method, pure water is dropped onto a carrier for a synthesis gas production catalyst by a small quantity at a time by means of a micropipette or a burette and the amount of pure water dropped until the catalyst surface becomes wet is measured.

Alternatively, at least either of the metals of Ru and Rh can be made to be carried by a carrier for a synthesis gas production catalyst according to the present invention by means of an impregnation method of adding a salt of the metal or aqueous solution of the salt to a dispersion obtained by dispersing a carrier for a synthesis gas production catalyst in water and mixing them.

A synthesis gas production catalyst can be obtained by drying and baking a carrier for a synthesis gas production catalyst that is made to carry Ru and/or Rh. The drying and baking conditions are not subjected to any particular limitations. However, the drying temperature is typically between 50 and 150° C. and the drying time is typically between 1 and 3 hours, while the baking temperature is typically between 300 and 500° C. and the baking time is typically between 1 and 5 hours.

A synthesis gas production catalyst, or a carrier for a synthesis gas production catalyst after having been made to carry Ru and/or Rh thereon and then dried and baked, is subsequently brought into contact with hydrogen and nitrogen at temperature not lower than 350° C. with a hydrogen to nitrogen molar ratio (hydrogen/nitrogen) between 1 and 10. Alternatively, the catalyst may be brought into contact with hydrogen and steam at temperature not lower than 350° C. with a hydrogen to steam molar ratio (hydrogen/steam) between 1 and 10. Then, as a result, a reduction treatment (dechlorination treatment) is executed to obtain an activated synthesis gas production catalyst.

With a synthesis gas production method according to the present invention, synthesis gas containing carbon monoxide and hydrogen is produced from source gas containing methane-containing light hydrocarbons and carbon dioxide (along with steam) in the presence of a synthesis gas production catalyst according to the present invention as defined above. A synthesis gas production catalyst according to the present invention can remarkably suppress the rate at which carbon deposits. Therefore, it is now possible to efficiently conduct carbon dioxide reforming operations and carbon dioxide/steam reforming operations on a stable basis for a long duration of time. For instance, the initial efficiency of such a reforming operation can be maintained after conducting a carbon dioxide reforming operation or a carbon dioxide/steam reforming operation for not less than 700 hours.

Light hydrocarbons that can be used for the purpose of the present invention are hydrocarbons having one to six carbon atoms in a molecule such as methane and ethane. For example, natural gas containing methane as principal component can suitably be used for the purpose of the present invention.

The reaction for producing synthesis gas containing carbon monoxide and hydrogen from source gas containing methane-containing light hydrocarbons and carbon dioxide (carbon dioxide reforming) is typically expressed by the chemical formula (1) shown below. The chemical formula (1) shown below typically represents an instance where methane is used as light hydrocarbon.

$$CH_4 + CO_2 \rightarrow 2H_2 + 2CO \tag{1}$$

A carbon dioxide reforming operation can be conducted by means of any of various contact systems including fixed bed systems, fluidized bed systems, suspension type systems and moving bed systems. For example, synthesis gas containing hydrogen and carbon monoxide can be produced by driving source gas containing methane-containing light hydrocarbons and carbon dioxide to pass through a reactor installed in a heating furnace and having a catalyst layer filled with a catalyst.

While the reaction conditions are not subjected to any particular limitations, typically the use of gas temperature between 700 and 900° C. at the catalyst layer outlet, gas pressure between 1.5 MPaG and 3.0 MPaG at the catalyst layer outlet and a gas hourly space velocity GHSV between 500/hour and 5,000/hour is preferable.

Preferably, source gas is made to flow in such a way that the abundance ratio of carbon dioxide to methane-containing light hydrocarbons, or $CO_2/C$ (where $CO_2$ represents the number of moles of carbon dioxide molecules and C represents the number of moles of carbon atoms derived from hydrocarbons), is found within the range between 0.4 and 1.0. As source gas is made to react within the above-defined $CO_2/C$ range, the ratio of source gas/generated synthesis gas (volume ratio) shows a small value so that synthesis gas can be highly efficiently produced. With conventional techniques, the problem of large carbon deposition occurs when synthesis gas is produced with the above-identified $CO_2/C$ range. However, a synthesis gas production catalyst according to the present invention can remarkably suppress carbon deposition. In other words, with a synthesis gas production catalyst according to the present invention, synthesis gas can be produced with the above-identified $CO_2/C$ range without large carbon deposition so that carbon dioxide reforming operations can efficiently be conducted on a stable basis for a long duration of time.

Alternatively, source gas containing steam in addition to methane-containing light hydrocarbons and carbon dioxide may be used for the purpose of the present invention. In other words, carbon dioxide/steam reforming operations may be conducted for the purpose of the present invention. With such an arrangement, synthesis gas can be produced by way of both a carbon dioxide reforming reaction and a steam reforming reaction. The reaction that takes place in a steam reforming operation is typically expressed by the chemical formula (2) shown below. The chemical formula (2) shown below typically represents an instance where methane is used as light hydrocarbon. Carbon dioxide reforming and steam reforming differ from each other particularly in terms of the $H_2$ to CO ratio in the obtained synthesis gas. Therefore, it is possible to obtain synthesis gas that contains $H_2$ and Co at a desired ratio by adjusting the carbon dioxide to steam ratio. When source gas containing methane-containing light hydrocarbons, carbon dioxide and steam is used, it is desirable to drive source gas to flow in such a way that the abundance ratio of steam to light hydrocarbons $H_2O/C$ (where $H_2O$ represents the number of moles of steam and C represents the number of moles of carbon atoms derived from hydrocarbons) in the source gas is found within the range between 0.1 and 3.0.

$$CH_4+H_2O \rightarrow 3H_2+CO \qquad (2)$$

When an inactivated synthesis gas production catalyst is to be employed unlike the above-described activated synthesis gas production catalyst, such a synthesis gas production catalyst is brought to contact with hydrogen and nitrogen under conditions including a hydrogen to nitrogen molar ratio (hydrogen/nitrogen) between 1 and 10 and temperature not lower than 350° C. or such a synthesis gas production catalyst is brought to contact with hydrogen and steam under conditions including a hydrogen to steam molar ratio (hydrogen/steam) between 1 and 10 and temperature not lower than 350° C. and subsequently the synthesis gas production catalyst is brought to contact with source gas.

EXAMPLES

Now, the present invention will be described further by way of examples for the purpose of easy understanding of the invention. Note, however, that the examples by no means limit the scope of the present invention. Also note that, while in the following description, units of "wt %" and "wtppm" are employed for representing concentrations or contents of ingredients, values expressed with these units are the same as values expressed with "mass %" and "mass ppm".

Example 1

Magnesium oxide powder (MgO) that contained calcium oxide (CaO) in the inside by 0.3 wt % in terms of Ca and showed a purity of 98.7 wt % (source magnesium oxide particles) was mixed with 3.0 wt % carbon as lubricant relative to the MgO powder and the mixture was used to form a cylindrical pellet having a diameter of ¼ inches. The formed pellet was baked at 1,180° C. in air for 3 h (three hours) to obtain the catalyst carrier of this example.

Figure 4:
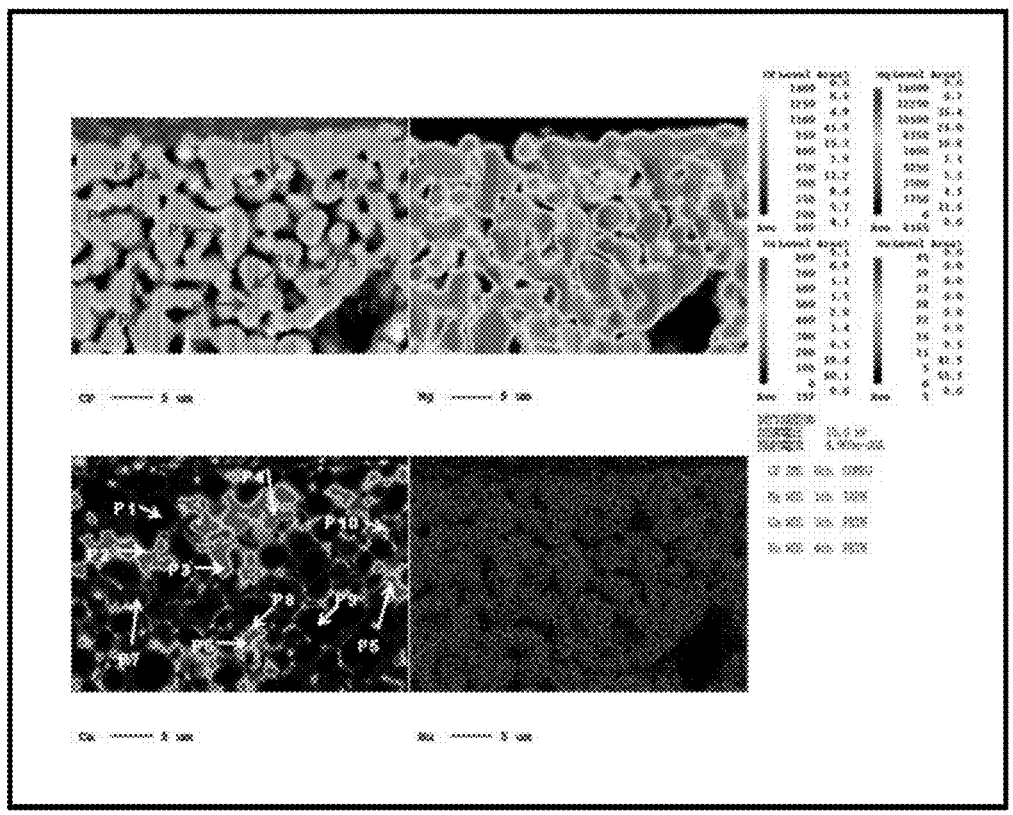
FIG. 4 is a set of images showing the results of the EPMA analysis of the carrier for the synthesis gas production catalyst in Example 1.

The obtained catalyst carrier was then analyzed by means of ICP emission analysis (to be also referred to simply as "ICP" hereinafter) to find that the catalyst carrier contained CaO by 0.3 wt % in terms of Ca. As a result of an EPMA analysis, it was confirmed that no Ca existed in the inside of the catalyst carrier and Ca existed only on the surfaces of MgO grains. Additionally, the MgO grains comprised in the obtained catalyst carrier were remarkably larger than the source magnesium oxide particles. Therefore, it may be safe to say that the source MgO particles agglomerated to form MgO grains and the CaO contained in the source magnesium oxide particles precipitated on the surfaces of the MgO grains. FIG. 4 is a schematic illustration of some of the results of the EPMA analysis of cross sections of the carrier for the synthesis gas production catalyst in Example 1. Table 1 below shows the results of quantification of each element obtained by an EPMA analysis conducted on the obtained catalyst carrier as expressed in terms of mol %. Note that analysis points P1 through P10 are the respective points indicated by arrows in FIG. 4.

As shown in FIG. 4, the obtained catalyst was in the form of spherical grains and peanut shell-like grains. Additionally, each catalyst carrier grains was such that part of the surface of the MgO grain was covered by a layer that contained CaO (CaO-containing layer) and CaO also existed in recesses on the surfaces of MgO grains. Additionally, the CaO existed within 10% of the depth from the catalyst surface. The quantity of calcium oxide on the surface of an MgO grain per unit area of the surface was determined in terms of Ca (mg-Ca/m²-MgO) (to be also referred to as "the abundance of CaO on the surface of an MgO grain" hereinafter) to find that it was 30 mg-Ca/m²-MgO in terms of Ca. As shown in FIG. 4 and Table 1, Ca was contained in the center part of peanut shell-like grain only by a very small amount (see analysis points P1 and P9) and Ca was mostly contained in the opposite end parts thereof (see analysis points P2 through P8 and P10).

TABLE 1

| Analysis point | Mg | Ca | Ru | O | Si |
|---|---|---|---|---|---|
| P1 | 51.2 | tr | — | 48.7 | tr |
| P2 | 57.2 | 0.2 | — | 42.5 | 0.2 |
| P3 | 41.0 | 6.3 | — | 16.0 | 6.8 |
| P4 | 39.0 | 4.6 | — | 50.7 | 5.8 |
| P5 | 50.2 | 1.6 | — | 47.9 | 0.3 |
| P6 | 48.2 | 1.2 | — | 50.5 | 0.2 |
| P7 | 54.1 | 0.1 | — | 45.8 | tr |
| P8 | 57.6 | 0.6 | — | 41.8 | — |
| P9 | 52.0 | tr | — | 47.9 | tr |
| P10 | 52.2 | 1.0 | — | 46.6 | 0.2 |

Then, aqueous solution of ruthenium nitrosyl nitrate containing Ru by 0.5 wt % was sprayed onto the obtained catalyst carrier at a rate of 0.15 cc per 1.0 g of the catalyst carrier (1.0 times of the water absorption of the catalyst carrier) to obtain a Ru-carrying catalyst carrier.

Thereafter, the obtained Ru-carrying catalyst carrier was dried in an oven arranged in the open air at 120° C. for 2.5 hours and subsequently baked in an electric furnace arranged in the open air at 400° C. for 2.0 hours to obtain a catalyst final product.

Figure 5:
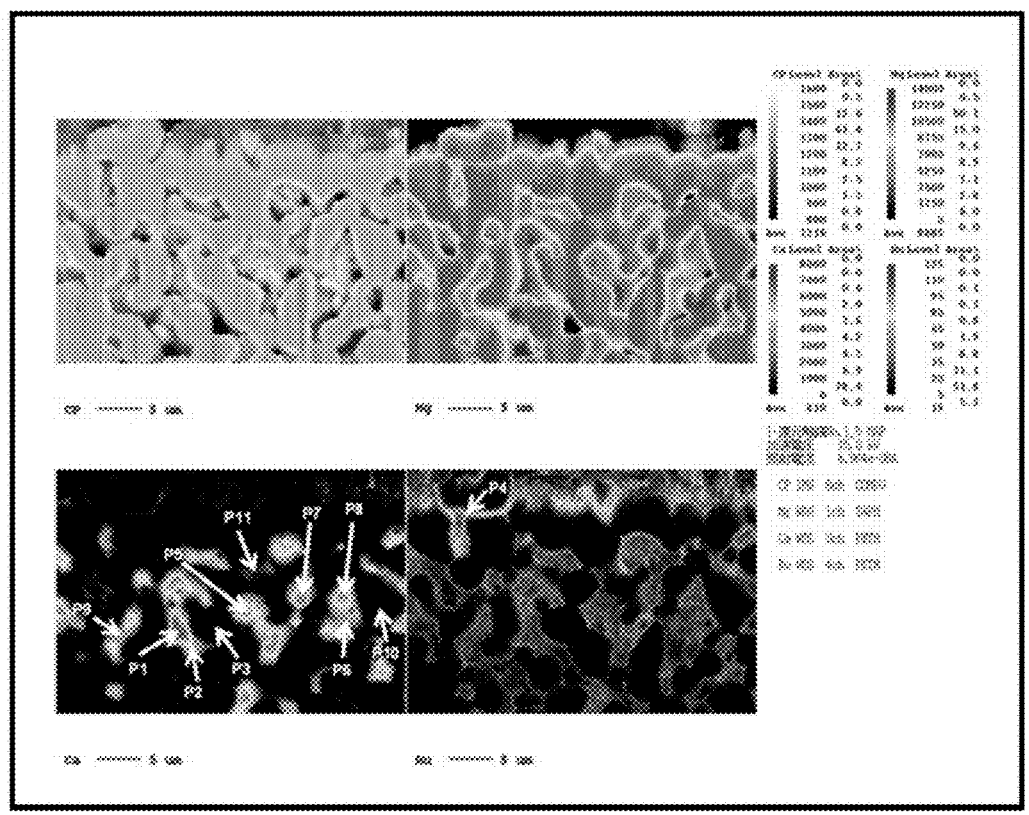
FIG. 5 is a set of images showing the results of the EPMA analysis of the synthesis gas production catalyst in Example 1.

The obtained catalyst contained Ru at a rate of 750 wtppm relative to the catalyst and its BET specific surface area was 0.10 m$^2$/g. Just like the catalyst carrier, the obtained catalyst was subjected to an EPMA analysis. FIG. 5 shows some of the results of the EPMA analysis conducted on the catalyst. Table 2 shows the result of quantification of each element obtained by the EPMA analysis conducted on the obtained catalyst as expressed in terms of mol %. Note that the analysis points P1 through P11 are the respective points indicated by arrows in FIG. 5.

As shown in FIG. 5, Ru was carried on the surfaces of the catalyst grains of the obtained catalyst. Ru existed within 10% of the depth from the catalyst surface. The fact that the positions of Ru substantially agreed with the positions of Ca evidenced that CaO existed in the vicinity of Ru. Note that all the Ru and CaO contained in the catalyst carrier existed on the surfaces of MgO grains.

As shown in FIG. 5 and Table 2, Ca was contained in the center part of peanut shell-like grain only by a very small amount (see analysis points P3 and P10) and Ca was mostly contained in the opposite end parts thereof (see analysis points P1, P2, P4 through P9 and P11).

TABLE 2

| Analysis point | Mg | Ca | Ru | O |
|---|---|---|---|---|
| P1 | 29.3 | 16.6 | 0.1 | 54.0 |
| P2 | 37.4 | 11.4 | 0.1 | 51.2 |
| P3 | 49.2 | tr | tr | 50.8 |
| P4 | 54.1 | 0.8 | 0.3 | 44.8 |
| P5 | 27.1 | 13.9 | 0.1 | 59.0 |
| P6 | 39.6 | 6.2 | 0.1 | 54.2 |
| P7 | 25.3 | 16.0 | 0.1 | 58.6 |
| P8 | 30.1 | 10.6 | 0.2 | 59.2 |
| P9 | 45.4 | 6.0 | 0.1 | 48.5 |
| P10 | 51.0 | tr | tr | 49.0 |
| P11 | 17.1 | 1.5 | 0.0 | 51.4 |

Reaction Example 1

50 cc of the catalyst prepared in Example 1 was filled in the catalyst layer of a reactor and an $H_2O/CO_2$ reforming test of methane was conducted. Note that the reactor was so designed that source gas was to be introduced from above of the catalyst layer and the source gas introduced into the catalyst layer was forced to come down and pass through the catalyst layer.

More specifically, to begin with, a reduction treatment (activation of the catalyst) was conducted by preliminarily causing mixture gas showing a molar ratio of $H_2$ to $H_2O$ of ($H_2/H_2O=1/0$) to flow through the catalyst layer at 500° C. for 1 hour so as to make it contact with the catalyst. Thereafter, source gas of $CH_4:CO_2:H_2O$ (molar ratio)=1: 2.5:1.5 was treated under the conditions of gas pressure at the outlet of the catalyst layer of 1471 kPaG, gas temperature at the outlet of the catalyst layer of 850° C. and GHSV=2,500/hour using methane as reference.

As a result of the test, the $CH_4$ conversion 5 hours after the start of the reaction was 92.5% ($CH_4$ equilibrium conversion=92.5% under the experiment conditions) and the $CH_4$ conversion after 1,500 hours from the start of the reaction was 92.5%. After 1,500 hours from the start of the reaction, catalyst was vertically divided into 4 pieces and drawn out to find that carbon had deposited on the catalyst and carbon/catalyst ratios of the pieces were sequentially from above 0.2 wt % (Top), 0.15 wt % (Md1), 0.1 wt % (Md2) and 0.1 wt (Btm). The $CH_4$ conversion is defined by the formula shown below.

$$CH_4 \text{ conversion } (\%)=(A-B)/A\times 100$$

A: number of moles of $CH_4$ in source gas
B: number of moles of $CH_4$ in reaction product (gas discharged from catalyst layer)

Figure 6:
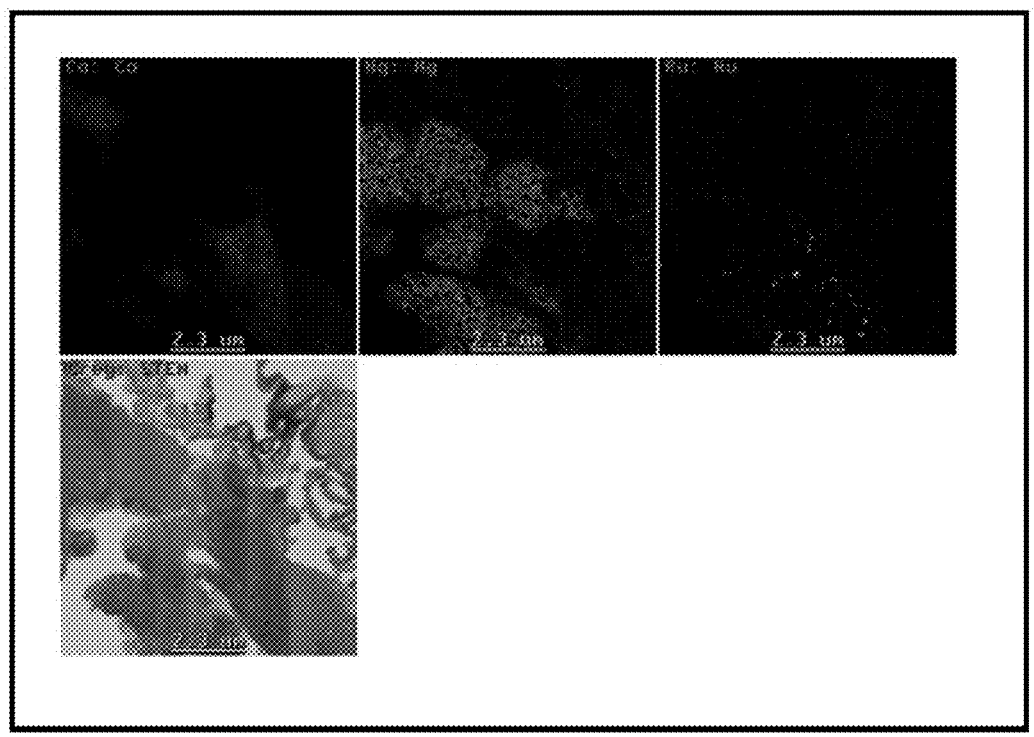
FIG. 6 is a set of images showing the results of the element mapping by EDX of the synthesis gas production catalyst after the reduction treatment in Example 1.

Additionally, an S-TEM analysis was conducted on the catalyst treated under the reduction conditions as described under Reaction Example 1 (catalyst before source gas was made to flow therethrough). FIG. 6 is a schematic illustration of some of the results of the element mapping by EDX of the synthesis gas production catalyst. In FIG. 6, the upper row shows Ca, Mg and Ru from left. The lower one is a TEM photograph.

As a result, it was confirmed that granular Ru existed on the catalyst surface. Additionally, as shown in FIG. 6, it was confirmed that Ru existed in the vicinity of Ca.

Example 2

MgO powder that contained CaO in the inside by 0.3 wt % in terms of Ca and showed a purity of not less than 98.7 wt % was mixed with 3.0 wt % carbon, which operated as lubricant relative to the MgO powder, and the mixture was used to form a cylindrical pellet having a diameter of ¼ inches. The formed pellet was baked at 1,180° C. in air for 3 hours to obtain the catalyst carrier of this example.

The obtained catalyst carrier was then analyzed by means of ICP to find that the catalyst carrier contained CaO by 0.3 wt % in terms of Ca. As a result of an EPMA analysis, it was confirmed that no Ca existed in the inside of the catalyst carrier and Ca existed only on the surfaces of MgO grains. Additionally, the MgO grains comprised in the obtained catalyst carrier were remarkably larger than the source magnesium oxide particles. Therefore, it may be safe to say that the source MgO particles agglomerated to form MgO grains and the CaO contained in the source MgO particles precipitated on the surfaces of the MgO grains. The obtained catalyst carrier was granular as in Example 1 and part of MgO grain was covered by a CaO-containing layer while CaO also existed in recesses on the surfaces of MgO grains. Additionally, CaO was found within 10% of the depth from the surface of the catalyst carrier. The abundance of CaO on the surface of an MgO grain was determined to find that it was 30 mg-Ca/m$^2$-MgO in terms of Ca. Ca was contained in the center part of peanut shell-like grain only by a very small amount and Ca was mostly contained in the opposite end parts thereof.

Then, aqueous solution of ruthenium chloride hydrate (RuCl$_3$) containing Ru by 0.55 wt % was sprayed onto the obtained catalyst carrier at a rate of 0.17 cc per 1.0 g of the catalyst carrier (1.1 times of the water absorption of the catalyst carrier) to obtain a Ru-carrying catalyst carrier.

Thereafter, the obtained Ru-carrying catalyst carrier was dried in an oven arranged in the open air at 120° C. for 2.5 hours and subsequently baked in an electric furnace arranged in the open air at 400° C. for 2.0 hours to obtain a catalyst final product.

The obtained catalyst contained Ru at a rate of 900 wtppm relative to the catalyst and its BET specific surface area was 0.10 m$^2$/g. The obtained catalyst was subjected to an EPMA analysis as in Example 1 to find that Ru was carried on the surfaces of the catalyst grains. Ru existed within 10% of the depth from the catalyst surface. Additionally, CaO existed in the vicinity of Ru.

Reaction Example 2

50 cc of the catalyst prepared in Example 2 was filled in a reactor similar to the one used in Example 1 and a CO$_2$ reforming test of methane was conducted.

More specifically, to begin with, a reduction treatment was conducted by preliminarily causing mixture gas showing a molar ratio of H$_2$ to H$_2$O of (H$_2$/H$_2$O=1/3) to flow through the catalyst layer at 500° C. for 1 hour so as to make it contact with the catalyst. Thereafter, source gas of CH$_4$:CO$_2$:H$_2$O (molar ratio)=1:1:0 was treated under the conditions of gas pressure at the outlet of the catalyst layer of 1960 kPaG, gas temperature at the outlet of the catalyst layer of 850° C. and GHSV=2,500/hour using methane as reference.

As a result of the test, the CH$_4$ conversion 5 hours after the start of the reaction was 54.8% (CH$_4$ equilibrium conversion=54.8% under the experiment conditions) and the CH$_4$ conversion 1,100 hours after the start of the reaction was 53.1%. As in the case of Example 1, 1,100 hours after the start of the reaction, the catalyst was vertically divided into 4 pieces and drawn out to find that the carbon/catalyst ratios of the pieces were sequentially from above 0.25 wt %, 0.1 wt %, 0.1 wt % and 0.04 wt %. Additionally, the catalyst that had been treated under the above-described treatment conditions of Reaction Example 2 was analyzed as in the instance of Example 1 to confirm that granular Ru existed on the catalyst surface.

Example 3

MgO powder that contained CaO in the inside by 0.3 wt % in terms of Ca and showed a purity of not less than 98.7 wt % was mixed with 3.0 wt % carbon, which operated as lubricant relative to the MgO powder, and the mixture was used to form a cylindrical pellet having a diameter of ¼ inches. The formed pellet was baked at 1,180° C. in air for 3 hours to obtain the catalyst carrier of this example.

The obtained catalyst carrier was then analyzed by means of ICP to find that the catalyst carrier contained CaO by 0.3 wt % in terms of Ca. As a result of an EPMA analysis, it was confirmed that no Ca existed in the inside of the catalyst carrier and Ca existed only on the surfaces of MgO grains. Additionally, the MgO grains comprised in the obtained catalyst carrier were remarkably larger than the source magnesium oxide particles. Therefore, it may be safe to say that the source MgO particles agglomerated to form MgO grains and the CaO contained in the source MgO grains precipitated on the surfaces of the MgO grains. The obtained catalyst carrier was granular as in Example 1 and part of the surface of MgO grain was covered by a CaO-containing layer while CaO also existed in recesses on the surfaces of MgO grains. Additionally, CaO was found within 10% of the depth from the surface of the catalyst carrier. The abundance of CaO on the surface of an MgO grain was determined to find that it was 30 mg-Ca/m$^2$-MgO in terms of Ca. Ca was contained in the center part of peanut shell-like grain only by a very small amount and Ca was mostly contained in the opposite end parts thereof.

Then, aqueous solution of ruthenium nitrate containing Ru by 0.17 wt % was sprayed onto the obtained catalyst carrier at a rate of 0.18 cc per 1.0 g of the catalyst carrier (1.2 times of the water absorption of the catalyst carrier) to obtain a Ru-carrying catalyst carrier.

Thereafter, the obtained Ru-carrying catalyst carrier was dried in an oven arranged in the open air at 120° C. for 2.5 hours and subsequently baked in an electric furnace arranged in the open air at 400° C. for 2.0 hours to obtain a catalyst final product.

The obtained catalyst contained Ru at a rate of 300 wtppm relative to the catalyst and its BET specific surface area was 0.10 m$^2$/g. The obtained catalyst was subjected to an EPMA analysis as in Example 1 to find that Ru was carried on the surfaces of the catalyst grains. Ru existed within 10% of the depth from the catalyst surface. Additionally, CaO existed in the vicinity of Ru.

Reaction Example 3

50 cc of the catalyst prepared in Example 3 was filled in a reactor similar to the one used in Example 1 and a H$_2$O/CO$_2$ reforming test of methane was conducted.

More specifically, to begin with, a reduction treatment was conducted by preliminarily causing mixture gas showing a molar ratio of H$_2$ to H$_2$O of (H$_2$/H$_2$O=1/6) to flow through the catalyst layer at 500° C. for 1 hour so as to make it contact with the catalyst. Thereafter, source gas of CH$_4$:CO$_2$:H$_2$O (molar ratio)=1:3:0.3 was treated under the conditions of gas pressure at the outlet of the catalyst layer of 1471 kPaG, gas temperature at the outlet of the catalyst layer of 900° C. and GHSV=2,500/hour using methane as reference.

As a result of the test, the CH$_4$ conversion 5 hours after the start of the reaction was 97.0% (CH$_4$ equilibrium conversion=97/0% under the experiment conditions) and the CH$_4$ conversion 15,000 hours after the start of the reaction was 97.0%. As in the case of Example 1, 15,000 hours after the start of the reaction, the catalyst was vertically divided into 4 pieces and drawn out to find that the carbon/catalyst ratios of the pieces were sequentially from above 0.2 wt %, 0.05 wt %, 0.03 wt % and 0.02 wt %. Additionally, the catalyst that had been treated under the above-described treatment conditions of Reaction Example 3 was analyzed as in Example 1 to confirm that granular Ru existed on the catalyst surface.

Example 4

MgO powder that contained CaO in the inside by 0.3 wt % in terms of Ca and showed a purity of not less than 98.7 wt % was mixed with 3.0 wt % carbon, which operated as lubricant relative to the MgO powder, and the mixture was used to form a cylindrical pellet having a diameter of ¼ inches. The formed pellet was baked at 1,150° C. in air for 3 hours to obtain the catalyst carrier of this example.

The obtained catalyst carrier was then analyzed by means of ICP to find that the catalyst carrier contained CaO by 0.3 wt % in terms of Ca. As a result of an EPMA analysis, it was confirmed that no Ca existed in the inside of the catalyst carrier and Ca existed only on the surfaces of MgO grains. Additionally, the MgO grains comprised in the obtained catalyst carrier were remarkably larger than the source magnesium oxide particles. Therefore, it may be safe to say that the source MgO particles agglomerated to form MgO grains and the CaO contained in the source MgO particles precipitated on the surfaces of the MgO grains. The obtained catalyst carrier was granular as in Example 1 and part of the surface of MgO grain was covered by a CaO-containing layer while CaO also existed in recesses on the surfaces of MgO grains. Additionally, CaO was found within 10% of the depth from the surface of the catalyst carrier. The abundance of CaO on the surface of MgO grain was determined to find that it was 25 mg-Ca/m$^2$-MgO in terms of Ca. Ca was contained in the center part of peanut shell-like grain only by a very small amount and Ca was mostly contained in the opposite end parts thereof.

Then, aqueous solution of rhodium acetate containing Ru (Rh(CH$_3$COO)$_3$) by 0.3 wt % was sprayed onto the obtained catalyst carrier at a rate of 0.15 cc per 1.0 g of the catalyst carrier (1.0 times of the water absorption of the catalyst carrier) to obtain a Ru-carrying catalyst carrier.

Thereafter, the obtained Rh-carrying catalyst carrier was dried in an oven arranged in the open air at 120° C. for 2.5 hours and subsequently baked in an electric furnace arranged in the open air at 650° C. for 2.0 hours to obtain a catalyst final product.

The obtained catalyst contained Rh at a rate of 450 wtppm relative to the catalyst and its BET specific surface area was 0.12 m$^2$/g. The obtained catalyst was subjected to an EPMA analysis as in Example 1 to find that Ru was carried on the surfaces of the catalyst grains. Ru existed within 10% of the depth from the catalyst surface. Additionally, CaO existed in the vicinity of Rh.

Reaction Example 4

50 cc of the catalyst prepared in Example 4 was filled in a reactor similar to the one used in Example 1 and a CO$_2$ reforming test of methane was conducted.

More specifically, to begin with, a reduction treatment was conducted by preliminarily causing mixture gas showing a molar ratio of H$_2$ to H$_2$O of (H$_2$/H$_2$O=1/6) to flow through the catalyst layer at 500° C. for 1 hour so as to make it contact with the catalyst. Thereafter, source gas of CH$_4$:CO$_2$:H$_2$O (molar ratio)=1:1:0 was treated under the conditions of gas pressure at the outlet of the catalyst layer of 1960 kPaG, gas temperature at the outlet of the catalyst layer of 850° C. and GHSV=2,500/hour using methane as reference.

As a result of the test, the CH$_4$ conversion 5 hours after the start of the reaction was 54.8% (CH$_4$ equilibrium conversion=54.8% under the experiment conditions) and the CH$_4$ conversion 300 hours after the start of the reaction was 54.8% while the CH$_4$ conversion 800 hours after the start of the reaction was 52.3%. As in the case of Example 1, 800 hours after the start of the reaction, the catalyst was vertically divided into 4 pieces and drawn out to find that the carbon contents of the pieces were sequentially from above 0.15 wt %, 0.1 wt %, 0.05 wt % and 0.03 wt %. Additionally, the catalyst that had been treated under the above-described treatment conditions of Reaction Example 4 was analyzed as in Example 1 to confirm that granular Ru existed on the catalyst surface.

Example 5

MgO powder that contained CaO in the inside by 0.3 wt % in terms of Ca and showed a purity of not less than 98.7 wt % was mixed with 3.0 wt % carbon, which operated as lubricant relative to the MgO powder, and the mixture was used to form a cylindrical pellet having a diameter of ¼ inches. The formed pellet was baked at 1,200° C. in air for 3 hours to obtain the catalyst carrier of this example.

The obtained catalyst carrier was then analyzed by means of ICP to find that the catalyst carrier contained CaO by 0.3 wt % in terms of Ca. As a result of an EPMA analysis, it was confirmed that no Ca existed in the inside of the catalyst carrier and Ca existed only on the surfaces of MgO grains. Additionally, the MgO grains comprised in the obtained catalyst carrier were remarkably larger than the source magnesium oxide particles. Therefore, it may be safe to say that the source MgO particles agglomerated to form MgO grains and the CaO contained in the source MgO particles precipitated on the surfaces of the MgO grains. The obtained catalyst carrier was granular as in Example 1 and part of the surface of MgO grain was covered by a CaO-containing layer while CaO also existed in recesses on the surfaces of MgO grains. Additionally, CaO was found within 10% of the depth from the surface of the catalyst carrier. The abundance of CaO on the surface of MgO grain was determined to find that it was 37.5 mg-Ca/m$^2$-MgO in terms of Ca. Ca was contained in the center part of peanut shell-like grain only by a very small amount and Ca was mostly contained in the opposite end parts thereof.

Then, aqueous solution of ruthenium nitrosyl nitrate containing Ru by 0.85 wt % was sprayed onto the obtained catalyst carrier by 0.13 g (1.0 times of the water absorption of the catalyst carrier) to obtain a Ru-carrying catalyst carrier.

Thereafter, the obtained Ru-carrying catalyst carrier was dried in an oven arranged in the open air at 120° C. for 2.5 hours and subsequently baked in an electric furnace arranged in the open air at 400° C. for 2.0 hours to obtain a catalyst final product.

The obtained catalyst contained Ru at a rate of 1,100 wtppm relative to the catalyst and its BET specific surface area was 0.08 m$^2$/g. The obtained catalyst was subjected to an EPMA analysis as in Example 1 to find that Ru was carried on the surfaces of the catalyst grains. Ru existed within 10% of the depth from the catalyst surface. Additionally, CaO existed in the vicinity of Ru.

Reaction Example 5

50 cc of the catalyst prepared in Example 5 was filled in a reactor similar to the one used in Example 1 and a CO$_2$ reforming test of methane was conducted.

More specifically, to begin with, a reduction treatment was conducted by preliminarily causing mixture gas showing a molar ratio of H$_2$ to H$_2$O of (H$_2$/H$_2$O=1/3) to flow through the catalyst layer at 500° C. for 1 hour so as to make it contact with the catalyst. Thereafter, source gas of CH$_4$:CO$_2$:H$_2$O (molar ratio)=1:1:0 was treated under the conditions of gas pressure at the outlet of the catalyst layer of 1960 kPaG, gas temperature at the outlet of the catalyst layer of 880° C. and GHSV=2,500/hour using methane as reference.

As a result of the test, the $CH_4$ conversion 5 hours after the start of the reaction was 54.8% ($CH_4$ equilibrium conversion=54.8% under the experiment conditions) and the $CH_4$ conversion 300 hours after the start of the reaction was 54.8% while the $CH_4$ conversion 700 hours after the start of the reaction was 53.5%. As in the case of Example 1, 700 hours after the start of the reaction, the catalyst was vertically divided into 4 pieces and drawn out to find that the carbon contents of the pieces were sequentially from above 0.15 wt %, 0.04 wt %, 0.03 wt % and 0.01 wt %. Additionally, the catalyst that had been treated under the above-described treatment conditions of Reaction Example 5 was analyzed as in the instance of Example 1 to confirm that granular Ru existed on the catalyst surface.

Example 6

MgO powder that contained CaO in the inside by 0.3 wt % in terms of Ca and showed a purity of not less than 98.7 wt % was mixed with 3.0 wt % carbon, which operated as lubricant relative to the MgO powder, and the mixture was used to form a cylindrical pellet having a diameter of ¼ inches. The formed pellet was baked at 1,130° C. in air for 3 hours to obtain the catalyst carrier of this example.

The obtained catalyst carrier was then analyzed by means of ICP to find that the catalyst carrier contained CaO by 0.3 wt % in terms of Ca. As a result of an EPMA analysis, it was confirmed that no Ca existed in the inside of the catalyst carrier and Ca existed only on the surfaces of MgO grains. Additionally, the MgO grains comprised in the obtained catalyst carrier were remarkably larger than the source magnesium oxide particles. Therefore, it may be safe to say that the source MgO particles agglomerated to form MgO grains and the CaO contained in the source MgO particles precipitated on the surfaces of the MgO grains. The obtained catalyst carrier was granular as in Example 1 and part of the surface of MgO grain was covered by a CaO-containing layer while CaO also existed in recesses on the surfaces of MgO grains. Additionally, CaO was found within 10% of the depth from the surface of the catalyst carrier. The abundance of CaO on the surface of MgO grain was determined to find that it was 20 mg-Ca/m$^2$-MgO in terms of Ca. Ca was contained in the center part of peanut shell-like grain only by a very small amount and Ca was mostly contained in the opposite end parts thereof.

Then, aqueous solution of ruthenium nitrate containing Ru by 0.6 wt % was sprayed onto the obtained catalyst carrier by 0.18 g (1.2 times of the water absorption of the catalyst carrier) to obtain a Ru-carrying catalyst carrier.

Thereafter, the obtained Ru-carrying catalyst carrier was dried in an oven arranged in the open air at 120° C. for 2.5 hours and subsequently baked in an electric furnace arranged in the open air at 400° C. for 2.0 hours to obtain a catalyst final product.

The obtained catalyst contained Ru at a rate of 780 wtppm relative to the catalyst and its BET specific surface area was 0.15 m$^2$/g. The obtained catalyst was subjected to an EPMA analysis as in Example 1 to find that Ru was carried on the surfaces of the catalyst grains. Ru existed within 10% of the depth from the catalyst surface. Additionally, CaO existed in the vicinity of Ru.

Reaction Example 6

50 cc of the catalyst prepared in Example 6 was filled in a reactor similar to the one used in Example 1 and an $H_2O/CO_2$ reforming test of methane was conducted.

More specifically, to begin with, a reduction treatment was conducted by preliminarily causing mixture gas showing a molar ratio of $H_2$ to $H_2O$ of ($H_2/H_2O=1/2$) to flow through the catalyst layer at 500° C. for 1 hour so as to make it contact with the catalyst. Thereafter, source gas of $CH_4$:$CO_2$:$H_2O$ (molar ratio)=1:0.4:1 was treated under the conditions of gas pressure at the outlet of the catalyst layer of 1960 kPaG, gas temperature at the outlet of the catalyst layer of 880° C. and GHSV=2,500/hour using methane as reference.

As a result of the test, the $CH_4$ conversion 5 hours after the start of the reaction was 66.7% ($CH_4$ equilibrium conversion=66.7% under the experiment conditions) and the $CH_4$ conversion 13,000 hours after the start of the reaction was 66.7%. As in the case of Example 1, 13,000 hours after the start of the reaction, the catalyst was vertically divided into 4 pieces and drawn out to find that the carbon contents of the pieces were sequentially from above 0.11 wt %, 0.05 wt %, 0.03 wt % and 0.01 wt %. Additionally, the catalyst that had been treated under the above-described treatment conditions of Reaction Example 6 was analyzed as in the instance of Example 1 to confirm that granular Ru existed on the catalyst surface.

Example 7

During an operation of boiling and agitating MgO powder containing CaO at a content of not more than 0.001 wt % in terms of Ca and showing a purity of not less than 99.9 wt % to produce Mg(OH)$_2$, Ca-added type Mg(OH)$_2$ particles were obtained by simultaneously dropping aqueous solution of Ca(OH)$_2$ and agitating the mixture. Then, the added type product was mixed with 3.0 wt % carbon, which operated as lubricant relative to the added type product, and a cylindrical pellet having a diameter of ¼ inches was formed from the mixture. The formed pellet was additionally baked at 1,180° C. in the air for 3 hours to obtain a catalyst carrier.

The obtained catalyst carrier was then analyzed by means of ICP as in Example 1 to find that the catalyst carrier contained CaO by 0.5 wt % in terms of Ca. As a result of an EPMA analysis, it was confirmed that no Ca existed in the inside of the catalyst carrier and Ca existed only on the surfaces of MgO grains. Additionally, the MgO grains comprised in the obtained catalyst carrier were remarkably larger than the Ca-added type Mg(OH)$_2$ particles. Therefore, it may be safe to say that the Ca-added type Mg(OH)$_2$ particles agglomerated to form MgO grains and the CaO contained in the Ca-added type Mg(OH)$_2$ particles precipitated on the surfaces of the MgO grains. The obtained catalyst carrier was granular as in Example 1 and part of the surface of MgO grain was covered by a CaO-containing layer while CaO also existed in recesses on the surfaces of MgO grains. Additionally, CaO was found within 10% of the depth from the surface of the catalyst carrier. The abundance of CaO on the surface of MgO grain was determined to find that it was 50 mg-Ca/m$^2$-MgO in terms of Ca. Ca was contained in the center part of peanut shell-like grain only by a very small amount and Ca was mostly contained in the opposite end parts thereof.

Then, aqueous solution of ruthenium nitrate that contained Ru by 0.8 wt % was sprayed onto the obtained catalyst carrier at a rate of 0.15 cc per 1.0 g of the catalyst carrier (1.0 times of the water absorption of the catalyst carrier) to obtain a Ru-carrying catalyst carrier.

Thereafter, the obtained Ru-carrying catalyst carrier was dried in an oven arranged in the open air at 120° C. for 2.5 hours and subsequently baked in an electric furnace arranged in the open air at 400° C. for 2.0 hours to obtain a catalyst final product.

The obtained catalyst contained Ru at a rate of 1,000 wtppm relative to the catalyst and its BET specific surface area was 0.10 m$^2$/g. The obtained catalyst was subjected to an EPMA analysis as in Example 1 to find that Ru was carried on the surfaces of the catalyst grains. Ru existed within 10% of the depth from the catalyst surface. Additionally, CaO existed in the vicinity of Ru.

Reaction Example 7

50 cc of the catalyst prepared in Example 7 was filled in a reactor similar to the one used in Example 1 and an $H_2O/CO_2$ reforming test of methane was conducted.

More specifically, to begin with, a reduction treatment was conducted by preliminarily causing mixture gas showing a molar ratio of $H_2$ to $H_2O$ of ($H_2/H_2O=1/2$) to flow through the catalyst layer at 500° C. for 1 hour so as to make it contact with the catalyst. Thereafter, source gas of $CH_4$: $CO_2$:$H_2O$ (molar ratio)=1:0.4:1 was treated under the conditions of gas pressure at the outlet of the catalyst layer of 1960 kPaG, gas temperature at the outlet of the catalyst layer of 880° C. and GHSV=2,500/hour using methane as reference.

As a result of the test, the $CH_4$ conversion 5 hours after the start of the reaction was 66.7% ($CH_4$ equilibrium conversion=66.7% under the experiment conditions) and the $CH_4$ conversion 13,000 hours after the start of the reaction was 66.7%. As in the case of Example 1, after the elapse of 13,000 hours, the catalyst was vertically divided into 4 pieces and drawn out to find that the carbon contents of the pieces were sequentially from above 0.15 wt %, 0.08 wt %, 0.05 wt % and 0.01 wt %. Additionally, the catalyst that had been treated under the above-described treatment conditions of Reaction Example 7 was analyzed as in the instance of Example 1 to confirm that granular Ru existed on the catalyst surface.

Example 8

During an operation of boiling and agitating MgO powder containing CaO at a content of not more than 0.001 wt % in terms of Ca and showing a purity of not less than 99.9 wt % to produce Mg(OH)$_2$, Ca-added type Mg(OH)$_2$ particles were obtained by simultaneously dropping aqueous solution of Ca(OH)$_2$ and agitating the mixture. Then, the added type product was mixed with 3.0 wt % carbon, which operated as lubricant relative to the added type product, and a pellet having a diameter of ¼ inches was formed from the mixture. The formed pellet was additionally baked at 1,180° C. in the air for 3 hours to obtain a catalyst carrier.

The obtained catalyst carrier was then analyzed by means of ICP as in Example 1 to find that the catalyst carrier contained CaO by 1.4 wt % in terms of Ca. As a result of an EPMA analysis, it was confirmed that no Ca existed in the inside of the catalyst carrier and Ca existed only on the surfaces of MgO grains. Additionally, the MgO grains comprised in the obtained catalyst carrier were remarkably larger than the Ca-added type Mg(OH)$_2$ particles. Therefore, it may be safe to say that the Ca-added type Mg(OH)$_2$ particles agglomerated to form MgO grains and the CaO contained in the Ca-added type Mg(OH)$_2$ particles precipitated on the surfaces of the MgO grains. The obtained catalyst carrier was granular as in Example 1 and part of the surface of MgO grain was covered by a CaO-containing layer while CaO also existed in recesses on the surfaces of MgO grains. Additionally, CaO was found within 10% of the depth from the surface of the catalyst carrier. The abundance of CaO on the surface of MgO grain was determined to find that it was 140 mg-Ca/m$^2$-MgO in terms of Ca. Ca was contained in the center part of peanut shell-like grain only by a very small amount and Ca was mostly contained in the opposite end parts thereof.

Then, aqueous solution of ruthenium nitrate that contained Ru by 0.7 wt % was sprayed onto the obtained catalyst carrier at a rate of 0.15 cc per 1.0 g of the catalyst carrier (1.0 times of the water absorption of the catalyst carrier) to obtain a Ru-carrying catalyst carrier.

Thereafter, the obtained Ru-carrying catalyst carrier was dried in an oven arranged in the open air at 120° C. for 2.5 hours and subsequently baked in an electric furnace arranged in the open air at 400° C. for 2.0 hours to obtain a catalyst final product.

The obtained catalyst contained Ru at a rate of 910 wtppm relative to the catalyst and its BET specific surface area was 0.10 m$^2$/g. The obtained catalyst was subjected to an EPMA analysis as in Example 1 to find that Ru was carried on the surfaces of the catalyst grains. Ru existed within 10% of the depth from the catalyst surface. Additionally, CaO existed in the vicinity of Ru.

Reaction Example 8

50 cc of the catalyst prepared in Example 8 was filled in a reactor similar to the one used in Example 1 and an $H_2O/CO_2$ reforming test of methane was conducted.

More specifically, to begin with, a reduction treatment was conducted by preliminarily causing mixture gas showing a molar ratio of $H_2$ to $H_2O$ of ($H_2/H_2O=1/1$) to flow through the catalyst layer at 500° C. for 1 hour so as to make it contact with the catalyst. Thereafter, source gas of $CH_4$: $CO_2$:$H_2O$ (molar ratio)=1:0.4:1 was treated under the conditions of gas pressure at the outlet of the catalyst layer of 1960 kPaG, gas temperature at the outlet of the catalyst layer of 880° C. and GHSV=2,500/hour using methane as reference.

As a result of the test, the $CH_4$ conversion 5 hours after the start of the reaction was 66.7% ($CH_4$ equilibrium conversion=66.7% under the experiment conditions) and the $CH_4$ conversion 9,000 hours after the start of the reaction was 66.7%. As in the case of Example 1, after the elapse of 9,000 hours, the catalyst was vertically divided into 4 pieces and drawn out to find that the carbon contents of the pieces were sequentially from above 0.21 wt %, 0.15 wt %, 0.08 wt % and 0.01 wt %. Additionally, the catalyst that had been treated under the above-described treatment conditions of Reaction Example 8 was analyzed as in the instance of Example 1 to confirm that granular Ru existed on the catalyst surface.

Example 9

MgO powder that contained CaO in the inside by 0.3 wt % in terms of Ca and showed a purity of not less than 98.7 wt % was mixed with 3.0 wt % carbon, which operated as lubricant relative to the MgO powder, and the mixture was used to form a cylindrical pellet having a diameter of ¼ inches. The formed pellet was baked at 1,150° C. in air for 3 hours to obtain the catalyst carrier of this example.

The obtained catalyst carrier was then analyzed by means of ICP as in Example 1 to find that the catalyst carrier contained CaO by 0.3 wt % in terms of Ca. As a result of an EPMA analysis, it was confirmed that no Ca existed in the inside of the catalyst carrier and Ca existed only on the surfaces of MgO grains. Additionally, the MgO grains comprised in the obtained catalyst carrier were remarkably larger than the source magnesium oxide grains. Therefore, it may be safe to say that the source MgO grains agglomerated to form MgO grains and the CaO contained in the source MgO grains precipitated on the surfaces of the MgO grains. The obtained catalyst carrier was granular as in Example 1 and part of the surface of MgO grain was covered by a CaO-containing layer while CaO also existed in recesses on the surfaces of MgO grains. Additionally, CaO was found within 10% of the depth from the surface of the catalyst carrier. The abundance of CaO on the surface of MgO grain was determined to find that it was 25 mg-Ca/m$^2$-MgO in terms of Ca. Ca was contained in the center part of peanut shell-like grain only by a very small amount and Ca was mostly contained in the opposite end parts thereof.

Then, aqueous solution of rhodium acetate containing Rh by 0.81 wt % was sprayed onto the obtained catalyst carrier by 0.17 cc (1.1 times of the water absorption of the catalyst carrier) relative to 1.0 g of the catalyst carrier to obtain a Rh-carrying catalyst carrier.

Thereafter, the obtained Rh-carrying catalyst carrier was dried in an oven arranged in the open air at 120° C. for 2.5 hours and subsequently baked in an electric furnace arranged in the open air at 650° C. for 2.0 hours to obtain a catalyst final product.

The obtained catalyst contained Rh at a rate of 1,350 wtppm relative to the catalyst and its BET specific surface area was 0.12 m$^2$/g. The obtained catalyst was subjected to an EPMA analysis as in Example 1 to find that Rh was carried on the surfaces of the catalyst grains. Rh existed within 10% of the depth from the catalyst surface. Additionally, CaO existed in the vicinity of Rh.

Reaction Example 9

50 cc of the catalyst prepared in Example 9 was filled in a reactor similar to the one used in Example 1 and an $H_2O/CO_2$ reforming test of methane was conducted.

More specifically, to begin with, a reduction treatment was conducted by preliminarily causing mixture gas showing a molar ratio of $H_2$ to $H_2O$ of ($H_2/H_2O=1/0$) to flow through the catalyst layer at 500° C. for 1 hour so as to make it contact with the catalyst. Thereafter, source gas of $CH_4$:$CO_2$:$H_2O$ (molar ratio)=1:0.4:1 was treated under the conditions of gas pressure of 1960 kPaG, gas temperature of 880° C. and GHSV=2,500/hour using methane as reference.

As a result of the test, the $CH_4$ conversion 5 hours after the start of the reaction was 66.7% ($CH_4$ equilibrium conversion=66.7% under the experiment conditions) and the $CH_4$ conversion 8,000 hours after the start of the reaction was 66.7%. As in the case of Example 1, 8,000 hours after the start of the reaction, the catalyst was vertically divided into 4 pieces and drawn out to find that the carbon contents of the pieces were sequentially from above 0.15 wt %, 0.07 wt %, 0.05 wt % and 0.01 wt %. Additionally, the catalyst that had been treated under the above-described treatment conditions of Reaction Example 9 was analyzed as in the instance of Example 1 to confirm that granular Rh existed on the catalyst surface.

Example 10

During an operation of boiling and agitating MgO powder containing CaO at a content of not more than 0.001 wt % in terms of Ca and showing a purity of not less than 99.9 wt % to produce $Mg(OH)_2$, Ca-added type $Mg(OH)_2$ particles were obtained by simultaneously dropping aqueous solution of $Ca(OH)_2$ and agitating the mixture. Then, the added type product was mixed with 3.0 wt % carbon, which operated as lubricant relative to the added type product, and a pellet having a diameter of ¼ inches was formed from the mixture. The formed pellet was additionally baked at 1,180° C. for 3 hours in the air to obtain a catalyst carrier.

The obtained catalyst carrier was then analyzed by means of ICP as in Example 1 to find that the catalyst carrier contained CaO by 0.01 wt % in terms of Ca. As a result of an EPMA analysis, it was confirmed that no Ca existed in the inside of the catalyst carrier and Ca existed only on the surfaces of MgO grains. Additionally, the MgO grains comprised in the obtained catalyst carrier were remarkably larger than the Ca-added type $Mg(OH)_2$ particles. Therefore, it may be safe to say that the Ca-added type $Mg(OH)_2$ particles agglomerated to form MgO grains and the CaO contained in the Ca-added type $Mg(OH)_2$ particles precipitated on the surfaces of the MgO grains. The obtained catalyst carrier was granular as in Example 1 and part of the surface of MgO grain was covered by a CaO-containing layer while CaO also existed in recesses on the surfaces of MgO grains. Additionally, CaO was found within 10% of the depth from the surface of the catalyst carrier. The abundance of CaO on the surface of MgO grain was determined to find that it was 1 mg-Ca/m$^2$-MgO in terms of Ca. Ca was contained in the center part of peanut shell-like grain only by a very small amount and Ca was mostly contained in the opposite end parts thereof.

Then, aqueous solution of ruthenium nitrate that contained Ru by 0.6 wt % was sprayed onto the obtained catalyst carrier at a rate of 0.15 cc per 1.0 g of the catalyst carrier (1.0 times of the water absorption of the catalyst carrier) to obtain a Ru-carrying catalyst carrier.

Thereafter, the obtained Ru-carrying catalyst carrier was dried in an oven arranged in the open air at 120° C. for 2.5 hours and subsequently baked in an electric furnace arranged in the open air at 400° C. for 2.0 hours to obtain a catalyst final product.

The obtained catalyst contained Ru at a rate of 780 wtppm relative to the catalyst and its BET specific surface area was 0.10 m$^2$/g. The obtained catalyst was subjected to an EPMA analysis as in Example 1 to find that Ru was carried on the surfaces of the catalyst grains. Ru existed within 10% of the depth from the catalyst surface. Additionally, CaO existed in the vicinity of Ru.

Reaction Example 10

50 cc of the catalyst prepared in Example 10 was filled in a reactor similar to the one used in Example 1 and an $H_2O/CO_2$ reforming test of methane was conducted.

More specifically, to begin with, a reduction treatment was conducted by preliminarily causing mixture gas showing a molar ratio of $H_2$ to $H_2O$ of ($H_2/H_2O=1/1$) to flow through the catalyst layer at 500° C. for 1 hour so as to make it contact with the catalyst. Thereafter, source gas of $CH_4$:$CO_2$:$H_2O$ (molar ratio)=1:0.4:1 was treated under the conditions of gas pressure at the outlet of the catalyst layer of 1960 kPaG, gas temperature at the outlet of the catalyst layer of 880° C. and GHSV=2,500/hour using methane as reference.

As a result of the test, the $CH_4$ conversion 5 hours after the start of the reaction was 66.7% ($CH_4$ equilibrium conversion=66.7% under the experiment conditions) and the $CH_4$ conversion 5,000 hours after the start of the reaction was 66.7%. As in the case of Example 1, after the elapse of 5,000 hours, the catalyst was vertically divided into 4 pieces and drawn out to find that the carbon contents of the pieces were sequentially from above 0.28 wt %, 0.17 wt %, 0.09 wt % and 0.01 wt %. Additionally, the catalyst that had been treated under the above-described treatment conditions of Reaction Example 10 was analyzed as in the instance of Example 1 to confirm that granular Ru existed on the catalyst surface.

Comparative Example 1

MgO powder that contained CaO in the inside by 0.3 wt % in terms of Ca and showed a purity of not less than 98.7 wt % was mixed with 3.0 wt % carbon, which operated as lubricant relative to the MgO powder, and the mixture was used to form a cylindrical pellet having a diameter of ¼ inches. The formed pellet was baked at 1,110° C. in air for 3 hours to obtain the catalyst carrier of this comparative example.

The obtained catalyst carrier was then analyzed by means of ICP as in Example 1 to find that the catalyst carrier contained CaO by 0.3 wt % in terms of Ca. As a result of an EPMA analysis, it was confirmed that no Ca existed in the inside of the catalyst carrier and Ca existed only on the surfaces of MgO grains. Additionally, the MgO grains comprised in the obtained catalyst carrier were remarkably larger than the source magnesium oxide particles. Therefore, it may be safe to say that the source MgO particles agglomerated to form MgO grains and the CaO contained in the source MgO particles precipitated on the surfaces of the MgO grains. The obtained catalyst carrier was granular as in Example 1 and part of the surface of MgO grain was covered by a CaO-containing layer while CaO also existed in recesses on the surfaces of MgO grains. Additionally, CaO was found within 10% of the depth from the surface of the catalyst carrier. The abundance of CaO on the surface of MgO grain was determined to find that it was 15 mg-Ca/m²-MgO in terms of Ca. Ca was contained in the center part of peanut shell-like grain only by a very small amount and Ca was mostly contained in the opposite end parts thereof.

Then, aqueous solution of nickel nitrate hydrate containing Ni by 8.0 wt % was sprayed onto the obtained catalyst carrier by 0.15 cc (1.0 times of the water absorption of the catalyst carrier) relative to 1.0 g of the catalyst carrier to obtain a Ni-carrying catalyst carrier.

Thereafter, the obtained Ni-carrying catalyst carrier was dried in an oven arranged in the open air at 120° C. for 2.5 hours and subsequently baked in an electric furnace arranged in the open air at 650° C. for 2.0 hours to obtain a catalyst final product.

The obtained catalyst contained Ni at a rate of 10,000 wtppm relative to the catalyst and its BET specific surface area was 0.20 m²/g. The obtained catalyst was subjected to an EPMA analysis as in Example 1 to find that Ni was carried on the surfaces of the catalyst grains. Ca and Ni existed within 10% of the depth from the catalyst surface.

Comparative Reaction Example 1

50 cc of the catalyst prepared in Comparative Example 1 was filled in a reactor similar to the one used in Example 1 and a $CO_2$ reforming test of methane was conducted.

More specifically, to begin with, a reduction treatment was conducted by preliminarily causing mixture gas showing a molar ratio of $H_2$ to $H_2O$ of ($H_2/H_2O=1/1$) to flow through the catalyst layer at 500° C. for 1 hour so as to make it contact with the catalyst. Thereafter, source gas of $CH_4$:$CO_2$:$H_2O$ (molar ratio)=1:1:0 was treated under the conditions of gas pressure at the outlet of the catalyst layer of 1960 kPaG, gas temperature at the outlet of the catalyst layer of 880° C. and GHSV=2,500/hour using methane as reference.

As a result of the test, the $CH_4$ conversion 5 hours after the start of the reaction was 15.3% ($CH_4$ equilibrium conversion=54.8% under the experiment conditions). As in the case of Example 1, 5 hours after the start of the reaction, the catalyst was vertically divided into 4 pieces and drawn out to find that the carbon contents of the pieces were sequentially from above 3.1 wt %, 2.3 wt %, 3.3 wt % and 2.8 wt %. Additionally, the catalyst that had been treated under the above-described treatment conditions of Comparative Reaction Example 1 was analyzed as in the instance of Example 1 to confirm that large Ni grains existed on the catalyst surface.

Comparative Example 2

MgO powder that contained CaO in the inside by 0.3 wt % in terms of Ca and showed a purity of not less than 98.7 wt % was mixed with 3.0 wt % carbon, which operated as lubricant relative to the MgO powder, and the mixture was used to form a cylindrical pellet having a diameter of ¼ inches. The formed pellet was baked at 600° C. in air for 3 hours to obtain the catalyst carrier of this comparative example.

Figure 7:
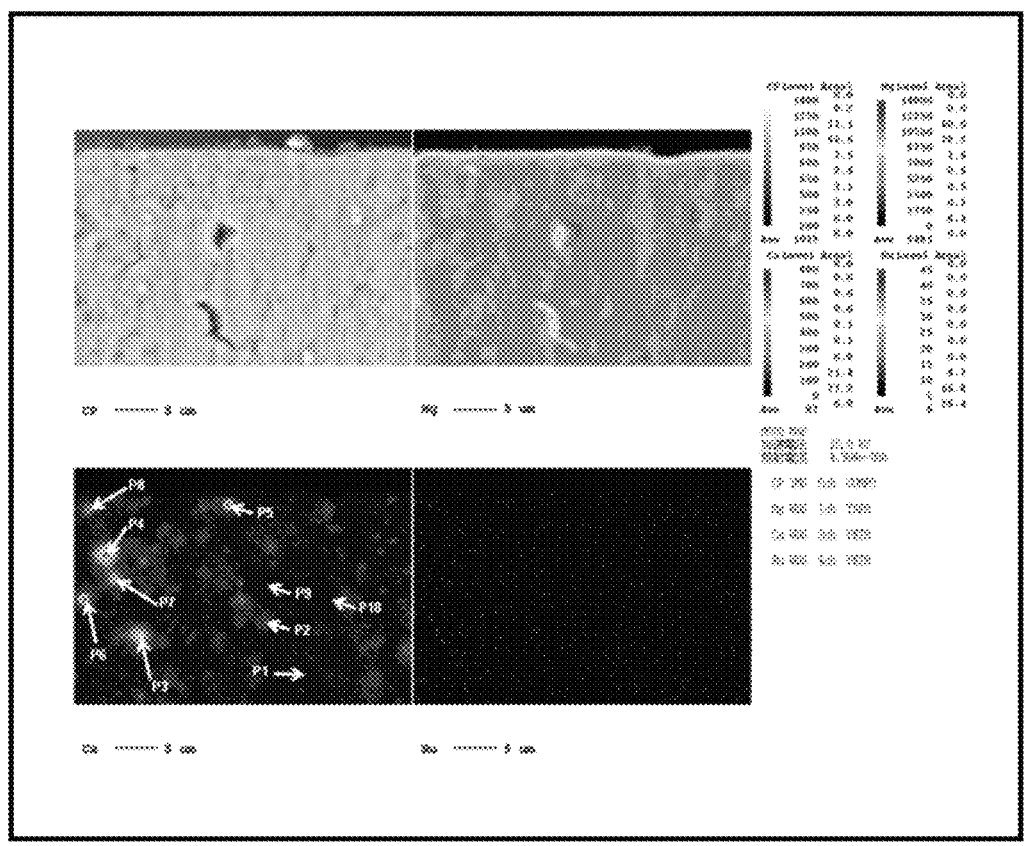
FIG. 7 is a set of images showing the results of the EPMA analysis of the synthesis gas production catalyst in Comparative Example 2.

The obtained catalyst carrier was then analyzed by means of ICP as in Example 1 to find that the catalyst carrier contained CaO by 0.3 wt % in terms of Ca. FIG. 7 shows some of the results of an EPMA analysis for the section of the catalyst carrier. As shown in FIG. 7, the obtained catalyst carrier was granular and Cao was uniformly distributed in the inside of MgO grains but precipitation of CaO on the surfaces of MgO grains could not be confirmed. In other words, no CaO existed on the surfaces of MgO grains of this catalyst carrier.

Then, aqueous solution of rhodium acetate containing Rh by 3.9 wt % was sprayed onto the obtained catalyst carrier by 0.39 cc (1.1 times of the water absorption of the catalyst carrier) relative to 1.0 g of the catalyst carrier to obtain an Rh-carrying catalyst carrier.

Thereafter, the obtained Rh-carrying catalyst carrier was dried in an oven arranged in the open air at 120° C. for 2.5 hours and subsequently baked in an electric furnace arranged in the open air at 950° C. for 2.0 hours to obtain a catalyst final product.

The obtained catalyst contained Rh at a rate of 15,000 wtppm relative to the catalyst and its BET specific surface area was 32.0 m²/g. The obtained catalyst was subjected to an EPMA analysis as in Example 1 to find that Rh was carried on the surfaces of the catalyst grains. Rh existed within 10% of the depth from the catalyst surface. Ca was uniformly distributed in the inside of MgO grains and no precipitation of Ca on the surfaces of the grains was confirmed. No CaO-containing layer existed on the surfaces. Rh did not exist in the vicinity of Ca.

Comparative Reaction Example 2

50 cc of the catalyst prepared in Comparative Example 2 was filled in a reactor similar to the one used in Example 1 and a $CO_2$ reforming test of methane was conducted.

More specifically, to begin with, a reduction treatment was conducted by preliminarily causing mixture gas showing a molar ratio of $H_2$ to $H_2O$ of ($H_2/H_2O=1/3$) to flow through the catalyst layer at 500° C. for 1 hour so as to make it contact with the catalyst. Thereafter, source gas of $CH_4$:$CO_2$:$H_2O$ (molar ratio)=1:1:0 was treated under the conditions of gas pressure at the outlet of the catalyst layer of 1960 kPaG, gas temperature at the outlet of the catalyst layer of 880° C. and GHSV=2,500/hour using methane as reference. The $CH_4$ conversion 5 hours after the start of the reaction was 54.8% ($CH_4$ equilibrium conversion=54.8% under the experiment conditions) and the $CH_4$ conversion 30 hours after the start of the reaction was 47.3%. As in the case of Example 1, 30 hours after the start of the reaction, the catalyst was vertically divided into 4 pieces and drawn out to find that the carbon contents of the pieces were sequentially from above 3.2 wt %, 2.3 wt %, 2.2 wt % and 2.1 wt %. Additionally, the catalyst that had been treated under the above-described treatment conditions of Comparative Reaction Example 2 was analyzed as in the instance of Example 1 to confirm that Rh particles existed on the catalyst surface.

Comparative Example 3

MgO powder that contained CaO in the inside by 0.3 wt % in terms of Ca and showed a purity of 98.7 wt % was mixed with 3.0 wt % carbon, which operated as lubricant relative to the MgO powder and the mixture was used to form a cylindrical pellet having a diameter of ¼ inches. The formed pellet was baked at 1,110° C. in air for 3 hours to obtain the catalyst carrier of this comparative example.

The obtained catalyst carrier was then analyzed by means of ICP as in Example 1 to find that the catalyst carrier contained CaO by 0.3 wt % in terms of Ca. As a result of an EPMA analysis, it was confirmed that no Ca existed in the inside of the catalyst carrier and Ca existed only on the surfaces of MgO grains. Additionally, the MgO grains comprised in the obtained catalyst carrier were remarkably larger than the source magnesium oxide particles. Therefore, it may be safe to say that the source MgO particles agglomerated to form MgO grains and the CaO contained in the source MgO particles precipitated on the surfaces of the MgO grains. The obtained catalyst carrier was granular as in Example 1 and part of the surface of MgO grain was covered by a CaO-containing layer while CaO also existed in recesses on the surfaces of MgO grains. Additionally, CaO was found within 10% of the depth from the surface of the catalyst carrier. The abundance of CaO on the surface of MgO grain was determined to find that it was 15 mg-Ca/$m^2$-MgO in terms of Ca. Ca was contained in the center part of peanut shell-like grain only by a very small amount and Ca was mostly contained in the opposite end parts thereof.

Then, aqueous solution of iridium chloride containing Ir by 2.7 wt % was sprayed onto the obtained catalyst carrier by 0.15 cc (1.0 times of the water absorption of the catalyst carrier) relative to 1.0 g of the catalyst carrier to obtain an Ir-carrying catalyst carrier.

Thereafter, the obtained Ir-carrying catalyst carrier was dried in an oven arranged in the open air at 120° C. for 2.5 hours and subsequently baked in an electric furnace arranged in the open air at 650° C. for 2.0 hours to obtain a catalyst final product.

The obtained catalyst contained Ir at a rate of 3,500 wtppm relative to the catalyst and its BET specific surface area was 0.20 $m^2$/g. The obtained catalyst was subjected to an EPMA analysis as in Example 1 to find that Ir was carried on the surfaces of the catalyst grains. Ca and Ir existed within 10% of the depth from the catalyst surface.

Comparative Reaction Example 3

50 cc of the catalyst prepared in Comparative Example 3 was filled in a reactor similar to the one used in Example 1 and a $CO_2$ reforming test of methane was conducted.

More specifically, to begin with, a reduction treatment was conducted by preliminarily causing mixture gas showing a molar ratio of $H_2$ to $H_2O$ of ($H_2/H_2O=1/1$) to flow through the catalyst layer at 500° C. for 1 hour so as to make it contact with the catalyst. Thereafter, source gas of $CH_4$:$CO_2$:$H_2O$ (molar ratio)=1:1:0 was treated under the conditions of gas pressure at the outlet of the catalyst layer of 1960 kPaG, gas temperature at the outlet of the catalyst layer of 880° C. and GHSV=2,500/hour using methane as reference. The $CH_4$ conversion 5 hours after the start of the reaction was 45.3% ($CH_4$ equilibrium conversion=54.8% under the experiment conditions) and the $CH_4$ conversion 50 hours after the start of the reaction was 38.2%. As in the case of Example 1, 50 hours after the start of the reaction, the catalyst was vertically divided into 4 pieces and drawn out to find that the carbon contents of the pieces were sequentially from above 0.8 wt %, 0.5 wt %, 0.3 wt % and 0.4 wt %. Additionally, the catalyst that had been treated under the above-described treatment conditions of Comparative Reaction Example 3 was analyzed as in the instance of Example 1 to confirm that Ir particles existed on the catalyst surface.

Comparative Example 4

MgO powder that contained CaO in the inside by 0.3 wt % in terms of Ca and showed a purity of not less than 98.7 wt % was mixed with 3.0 wt % carbon, which operated as lubricant relative to the MgO powder, and the mixture was used to form a cylindrical pellet having a diameter of ¼ inches. The formed pellet was baked at 1,110° C. in air for 3 hours to obtain the catalyst carrier of this comparative example.

The obtained catalyst carrier was then analyzed by means of ICP as in Example 1 to find that the catalyst carrier contained CaO by 0.3 wt % in terms of Ca. As a result of an EPMA analysis, it was confirmed that no Ca existed in the inside of the catalyst carrier and Ca existed only on the surfaces of MgO grains. Additionally, the MgO grains comprised in the obtained catalyst carrier were remarkably larger than the source magnesium oxide particles. Therefore, it may be safe to say that the source MgO particles agglomerated to form MgO grains and the CaO contained in the source MgO particles precipitated on the surfaces of the MgO grains. The obtained catalyst carrier was granular as in Example 1 and part of the surface of MgO grain was covered by a CaO-containing layer while CaO also existed in recesses on the surfaces of MgO grains. Additionally, CaO was found within 10% of the depth from the surface of the catalyst carrier. The abundance of CaO on the surface of MgO particle was determined to find that it was 15 mg-Ca/$m^2$-MgO in terms of Ca. Ca was contained in the center part of peanut shell-like grain only by a very small amount and Ca was mostly contained in the opposite end parts thereof.

Then, aqueous solution of osmium oxide containing Os by 1.6 wt % was sprayed onto the obtained catalyst carrier by 0.15 cc (1.0 times of the water absorption of the catalyst carrier) relative to 1.0 g of the catalyst carrier to obtain an Os-carrying catalyst carrier.

Thereafter, the obtained Os-carrying catalyst carrier was dried in an oven arranged in the open air at 120° C. for 2.5 hours and subsequently baked in an electric furnace arranged in the open air at 650° C. for 2.0 hours to obtain a catalyst final product.

The obtained catalyst contained Os at a rate of 3,500 wtppm relative to the catalyst and its BET specific surface area was 0.20 m$^2$/g. The obtained catalyst was subjected to an EPMA analysis as in Example 1 to find that Os was carried on the surfaces of the catalyst grains. Ca and Os existed within 10% of the depth from the catalyst surface.

Comparative Reaction Example 5

50 cc of the catalyst prepared in Comparative Example 4 was filled in a reactor similar to the one used in Example 1 and a $CO_2$ reforming test of methane was conducted.

More specifically, to begin with, a reduction treatment was conducted by preliminarily causing mixture gas showing a molar ratio of $H_2$ to $H_2O$ of ($H_2/H_2O$=1/6) to flow through the catalyst layer at 500° C. for 1 hour so as to make it contact with the catalyst. Thereafter, source gas of $CH_4$:$CO_2$:$H_2O$ (molar ratio)=1:1:0 was treated under the conditions of gas pressure at the outlet of the catalyst layer of 1960 kPaG, gas temperature at the outlet of the catalyst layer of 880° C. and GHSV=2,500/hour using methane as reference.

As a result, the $CH_4$ conversion 5 hours after the start of the reaction was 6.3% ($CH_4$ equilibrium conversion=54.8% under the experiment conditions) and the $CH_4$ conversion 20 hours after the start of the reaction was 3.5%. As in the case of Example 1, 20 hours after the start of the reaction, the catalyst was vertically divided into 4 pieces and drawn out to find that the carbon contents of the pieces were sequentially from above 28.7 wt %, 12.3 wt %, 8.5 wt % and 7.8 wt %. Additionally, the catalyst that had been treated under the above-described treatment conditions of Comparative Reaction Example 4 was analyzed as in the instance of Example 1 to confirm that Os particles existed on the catalyst surface.

Comparative Example 5

A commercially available silica alumina compact whose CaO content was not more than 0.01 wt % in terms of Ca was baked in air at 950° C. for 3 hours to obtain a catalyst carrier.

The obtained catalyst carrier was then analyzed by means of ICP as in Example 1 to find that the catalyst carrier contained CaO by not more than 0.01 wt % in terms of Ca. No Ca existed on the surface of the obtained catalyst carrier.

Then, aqueous solution of rhodium acetate containing Rh by 0.48 wt % was sprayed onto the obtained catalyst carrier by 0.58 cc (1.2 times of the water absorption of the catalyst carrier) relative to 1.0 g of the catalyst carrier to obtain an Rh-carrying silica alumina catalyst carrier.

Thereafter, the obtained Rh-carrying catalyst carrier was dried in an oven arranged in the open air at 120° C. for 2.5 hours and subsequently baked in an electric furnace arranged in the open air at 950° C. for 2.0 hours to obtain a catalyst final product.

The obtained catalyst contained Rh at a rate of 850 wtppm relative to the catalyst and its BET specific surface area was 24.0 m$^2$/g. The obtained catalyst was subjected to an EPMA analysis as in Example 1 to find that no Ca existed in the vicinity of Rh.

Comparative Reaction Example 5

50 cc of the catalyst prepared in Comparative Example 5 was filled in a reactor similar to the one used in Example 1 and a $CO_2$ reforming test of methane was conducted.

More specifically, to begin with, a reduction treatment was conducted by preliminarily causing mixture gas showing a molar ratio of $H_2$ to $H_2O$ of ($H_2/H_2O$=1/0) to flow through the catalyst layer at 500° C. for 1 hour so as to make it contact with the catalyst. Thereafter, source gas of $CH_4$:$CO_2$:$H_2O$ (molar ratio)=1:1:0 was treated under the conditions of gas pressure at the outlet of the catalyst layer of 1960 kPaG, gas temperature at the outlet of the catalyst layer of 880° C. and GHSV=2,500/hour using methane as reference. The $CH_4$ conversion 5 hours after the start of the reaction was 35.3% ($CH_4$ equilibrium conversion=54.8% under the experiment conditions) and the $CH_4$ conversion 20 hours after the start of the reaction was 28.2%. As in the case of Example 1, 20 hours after the start of the reaction, the catalyst was vertically divided into 4 pieces and drawn out to find that the carbon contents of the pieces were sequentially from above 1.8 wt %, 1.3 wt %, 0.8 wt % and 0.5 wt %. Additionally, the catalyst that had been treated under the above-described treatment conditions of Comparative Reaction Example 5 was analyzed as in the instance of Example 1 to confirm that Ru particles existed on the catalyst surface.

Comparative Example 6

A commercially available ZnO compact whose CaO content was not more than 0.01 wt % in terms of Ca was baked in air at 950° C. for 3 hours to obtain a catalyst carrier.

The obtained catalyst carrier was then analyzed by means of ICP as in Example 1 to find that the catalyst carrier contained CaO by not more than 0.01 wt % in terms of Ca. No Ca existed on the surface of the obtained catalyst carrier.

Then, aqueous solution of rhodium acetate containing Rh by 0.37 wt % was sprayed onto the obtained catalyst carrier by 0.37 cc (1.0 times of the water absorption of the catalyst carrier) relative to 1.0 g of the catalyst carrier to obtain an Rh-carrying catalyst carrier ZnO. As a result of a measurement conducted on the obtained Rh-carrying catalyst carrier, it was found that its BET specific surface was 1.5 m$^2$/g. Additionally, the obtained Rh-carrying catalyst carrier was subjected to an EPMA analysis as in Example 1 to find that Ca was not unevenly distributed on the surface of the catalyst carrier.

Thereafter, the obtained Rh-carrying catalyst carrier ZnO was dried in an oven arranged in the open air at 120° C. for 2.5 hours and subsequently baked in an electric furnace arranged in the open air at 950° C. for 2.0 hours to obtain a catalyst final product.

The obtained catalyst contained Rh at a rate of 900 wtppm relative to the catalyst and its BET specific surface area was 1.50 m$^2$/g. The obtained catalyst was subjected to an EPMA analysis as in Example 1 to find that no Ca existed in the vicinity of Rh.

Comparative Reaction Example 6

50 cc of the catalyst prepared in Comparative Example 6 was filled in a reactor similar to the one used in Example 1 and a $CO_2$ reforming test of methane was conducted.

More specifically, to begin with, a reduction treatment was conducted by preliminarily causing mixture gas showing a molar ratio of $H_2$ to $H_2O$ of ($H_2/H_2O$=1/2) to flow through the catalyst layer at 500° C. for 1 hour so as to make it contact with the catalyst. Thereafter, source gas of $CH_4$:$CO_2$:$H_2O$ (molar ratio)=1:1:0 was treated under the conditions of gas pressure at the outlet of the catalyst layer of 1960 kPaG, gas temperature at the outlet of the catalyst layer of 880° C. and GHSV=2,500/hour using methane as reference. The $CH_4$ conversion 5 hours after the start of the reaction was 15.8% ($CH_4$ equilibrium conversion=54.8% under the experiment conditions) and the $CH_4$ conversion 40 hours after the start of the reaction was 10.2%. As in the case of Example 1, 40 hours after the start of the reaction, the catalyst was vertically divided into 4 pieces and drawn out to find that the carbon contents of the pieces were sequentially from above 5.5 wt %, 5.1 wt %, 3.2 wt % and 2.1 wt %. Additionally, the catalyst that had been treated under the above-described treatment conditions of Comparative Reaction Example 6 was analyzed as in the instance of Example 1 to confirm that Rh particles existed on the catalyst surface.

Comparative Example 7

A commercially available CaO compact was baked in air at 950° C. for 3 hours to obtain a catalyst carrier. The obtained catalyst carrier was then analyzed by means of ICP as in Example 1 to find that CaO was the single constituent of the obtained catalyst carrier.

Then, aqueous solution of rhodium acetate containing Rh by 0.3 wt % was sprayed onto the obtained catalyst carrier by 0.25 cc (1.1 times of the water absorption of the catalyst carrier) relative to 1.0 g of the catalyst carrier to obtain an Rh-carrying catalyst carrier.

Thereafter, the obtained Rh-carrying catalyst carrier was dried in an oven arranged in the open air at 120° C. for 2.5 hours and subsequently baked in an electric furnace arranged in the open air at 950° C. for 2.0 hours to obtain a catalyst final product.

The obtained catalyst contained Rh at a rate of 780 wtppm relative to the catalyst and its BET specific surface area was 8.90 m²/g. The obtained catalyst was subjected to an EPMA analysis as in Example 1 to find that Rh was carried on the surface of the CaO carrier.

Comparative Reaction Example 7

50 cc of the catalyst prepared in Comparative Example 7 was filled in a reactor similar to the one used in Example 1 and a CO: reforming test of methane was conducted.

More specifically, to begin with, a reduction treatment was conducted by preliminarily causing mixture gas showing a molar ratio of $H_2$ to $H_2O$ of ($H_2$/$H_2O$=1/5) to flow through the catalyst layer at 500° C. for 1 hour so as to make it contact with the catalyst. Thereafter, source gas of $CH_4$:$CO_2$:$H_2O$ (molar ratio)=1:1:0 was treated under the conditions of gas pressure at the outlet of the catalyst layer of 1960 kPaG, gas temperature at the outlet of the catalyst layer of 880° C. and GHSV=2,500/hour using methane as reference. The $CH_4$ conversion 5 hours after the start of the reaction was 25.3% ($CH_4$ equilibrium conversion=54.8% under the experiment conditions) and the $CH_4$ conversion 70 hours after the start of the reaction was 18.2%. As in the case of Example 1, 70 hours after the start of the reaction, the catalyst was vertically divided into 4 pieces and drawn out to find that the carbon contents of the pieces were sequentially from above 17.4 wt %, 10.3 wt %, 5.1 wt % and 4.7 wt %. Additionally, the catalyst that had been treated under the above-described treatment conditions of Comparative Reaction Example 7 was analyzed as in the instance of Example 1 to confirm that Rh particles existed on the catalyst surface.

Comparative Example 8

A commercially available $ZrO_2$ compact whose CaO content was not more than 0.01 wt % in terms of Ca was baked in air at 950° C. for 3 hours to obtain a catalyst carrier.

The obtained catalyst carrier was then analyzed by means of ICP as in Example 1 to find that the catalyst carrier contained CaO by not more than 0.01 wt % in terms of Ca. No Ca existed on the surface of the obtained catalyst carrier.

Then, aqueous solution of rhodium acetate containing Rh by 0.28 wt % was sprayed onto the obtained catalyst carrier by 0.22 cc (1.2 times of the water absorption of the catalyst carrier) relative to 1.0 g of the catalyst carrier to obtain an Rh-carrying catalyst carrier.

Thereafter, the obtained Rh-carrying catalyst carrier was dried in an oven arranged in the open air at 120° C. for 2.5 hours and subsequently baked in an electric furnace arranged in the open air at 950° C. for 2.0 hours to obtain a catalyst final product.

The obtained catalyst contained Rh at a rate of 900 wtppm relative to the catalyst and its BET specific surface area was 4.20 m²/g. The obtained catalyst was subjected to an EPMA analysis as in Example 1 to confirm that granular Ru existed on the catalyst surface.

Comparative Reaction Example 8

50 cc of the catalyst prepared in Comparative Example 8 was filled in a reactor similar to the one used in Example 1 and a $CO_2$ reforming test of methane was conducted.

More specifically, to begin with, a reduction treatment was conducted by preliminarily causing mixture gas showing a molar ratio of $H_2$ to $H_2O$ of ($H_2$/$H_2O$=1/3) to flow through the catalyst layer at 500° C. for 1 hour so as to make it contact with the catalyst. Thereafter, source gas of $CH_4$:$CO_2$:$H_2O$ (molar ratio)=1:1:0 was treated under the conditions of gas pressure at the outlet of the catalyst layer of 1960 kPaG, gas temperature at the outlet of the catalyst layer of 880° C. and GHSV=2,500/hour using methane as reference. The $CH_4$ conversion 5 hours after the start of the reaction was 37.8% ($CH_4$ equilibrium conversion=54.8% under the experiment conditions) and the $CH_4$ conversion 10 hours after the start of the reaction was 30.2%. As in the case of Example, 10 hours after the start of the reaction, the catalyst was vertically divided into 4 pieces and drawn out to find that the carbon contents of the pieces were sequentially from above 1.5 wt %, 2.3 wt %, 3.2 wt % and 3.2 wt %. Additionally, the catalyst that had been treated under the above-described treatment conditions of Comparative Reaction Example 8 was analyzed as in the instance of Example 1 to confirm that Rh particles existed on the catalyst surface.

Comparative Example 9

A commercially available $Al_2O_3$ compact whose CaO content was not more than 0.01 wt % in terms of Ca was baked in air at 950° C. for 3 hours to obtain a catalyst carrier.

The obtained catalyst carrier was then analyzed by means of ICP as in Example 1 to find that the catalyst carrier contained CaO by not more than 0.01 wt % in terms of Ca. No Ca existed on the surface of the obtained catalyst carrier.

Then, aqueous solution of rhodium acetate containing Rh by 0.16 wt % was sprayed onto the obtained catalyst carrier by 0.75 cc (1.0 times of the water absorption of the catalyst carrier) relative to 1.0 g of the catalyst carrier to obtain an Rh-carrying catalyst carrier.

Thereafter, the obtained Rh-carrying catalyst carrier was dried in an oven arranged in the open air at 120° C. for 2.5 hours and subsequently baked in an electric furnace arranged in the open air at 950° C. for 2.0 hours to obtain a catalyst final product.

The obtained catalyst contained Rh at a rate of 1,200 wtppm relative to the catalyst and its BET specific surface area was 110.0 m$^2$/g. The obtained catalyst was subjected to an EPMA analysis as in Example 1 to find that Ca did not exist selectively in the vicinity of Rh.

Comparative Reaction Example 9

50 cc of the catalyst prepared in Comparative Example 9 was filled in a reactor similar to the one used in Example 1 and a $CO_2$ reforming test of methane was conducted.

More specifically, to begin with, a reduction treatment was conducted by preliminarily causing mixture gas showing a molar ratio of $H_2$ to $H_2O$ of ($H_2/H_2O$=1/1) to flow through the catalyst layer at 500° C. for 1 hour so as to make it contact with the catalyst. Thereafter, source gas of $CH_4$:$CO_2$:$H_2O$ (molar ratio)=1:1:0 was treated under the conditions of gas pressure at the outlet of the catalyst layer of 1960 kPaG, gas temperature at the outlet of the catalyst layer of 880° C. and GHSV=2,500/hour using methane as reference. The $CH_4$ conversion 5 hours after the start of the reaction was 54.8% ($CH_4$ equilibrium conversion=54.8% under the experiment conditions) and the $CH_4$ conversion 50 hours after the start of the reaction was 51.2%. As in the case of Example 1, 50 hours after the start of the reaction, the catalyst was vertically divided into 4 pieces and drawn out to find that the carbon contents of the pieces were sequentially from above 16.1 wt %, 10.3 wt %, 5.2 wt % and 4.8 wt %. Additionally, the catalyst that had been treated under the above-described treatment conditions of Comparative Reaction Example 9 was analyzed as in the instance of Example 1 to confirm that Rh particles existed on the catalyst surface.

Comparative Example 10

MgO powder that contained CaO by not more than 0.001 wt % in terms of Ca and showed a purity of not less than 99.9 wt % was mixed with 3.0 wt % carbon, which operated as lubricant relative to MgO powder, and the mixture was used to form a cylindrical pellet having a diameter of ¼ inches. The formed pellet was baked at 1,110° C. in air for 3 hours to obtain the catalyst carrier of this comparative example.

The obtained catalyst carrier was then analyzed by means of ICP as in Example 1 to find that the catalyst carrier contained CaO by not more than 0.001 wt % in terms of Ca and its BET specific surface area was 0.2 m$^2$/g. No precipitation of CaO was confirmed on the surface of the catalyst carrier and no CaO existed on the catalyst carrier surface.

Then, aqueous solution of rhodium acetate containing Rh by 0.73 wt % was sprayed onto the obtained catalyst carrier by 0.18 cc (a mass of 1.2 times of the water absorption of the catalyst carrier) relative to 1.0 g of the catalyst carrier to obtain an Rh-carrying catalyst carrier.

Thereafter, the obtained Rh-carrying catalyst carrier was dried in an oven arranged in the open air at 120° C. for 2.5 hours and subsequently baked in an electric furnace arranged in the open air at 950° C. for 2.0 hours to obtain a catalyst final product.

The obtained catalyst contained Rh at a rate of 1,300 wtppm relative to the catalyst and its BET specific surface area was 0.20 m$^2$/g. The obtained catalyst was subjected to an EPMA analysis as in Example 1 to find that no Ca existed in the vicinity of Rh.

Comparative Reaction Example 10

50 cc of the catalyst prepared in Comparative Example 10 was filled in a reactor similar to the one used in Example 1 and a $CO_2$ reforming test of methane was conducted.

More specifically, to begin with, a reduction treatment was conducted by preliminarily causing mixture gas showing a molar ratio of $H_2$ to $H_2O$ of ($H_2/H_2O$=1/3) to flow through the catalyst layer at 500° C. for 1 hour so as to make it contact with the catalyst. Thereafter, source gas of $CH_4$:$CO_2$:$H_2O$ (molar ratio)=1:1:0 was treated under the conditions of gas pressure at the outlet of the catalyst layer of 1960 kPaG, gas temperature at the outlet of the catalyst layer of 880° C. and GHSV=2,500/hour using methane as reference.

As a result, the $CH_4$ conversion 5 hours after the start of the reaction was 54.8% ($CH_4$ equilibrium conversion=54.8% under the experiment conditions) and the $CH_4$ conversion 70 hours after the start of the reaction was 52.3%. As in the case of Example 1, 70 hours after the start of the reaction, the catalyst was vertically divided into 4 pieces and drawn out to find that the carbon contents of the pieces were sequentially from above 6.5 wt %, 3.5 wt %, 3.2 wt % and 2.4 wt %. Additionally, the catalyst was analyzed as in the instance of Example 1 to confirm that Rh particles existed on the catalyst surface.

Comparative Reaction Example 11

MgO powder that contained CaO by not more than 0.001 wt % in terms of Ca and showed a purity of not less than 99.9 wt % was mixed with 3.0 wt % carbon, which operated as lubricant relative to the MgO powder, and the mixture was used to form a cylindrical pellet having a diameter of ¼ inches. The formed pellet was baked at 1,110° C. in air for 3 hours to obtain the catalyst carrier of this comparative example.

The obtained catalyst carrier was then analyzed by means of ICP as in Example 1 to find that the catalyst carrier contained CaO by not more than 0.001 wt % in terms of Ca. No precipitation of CaO on the surface of the obtained catalyst carrier was confirmed. In other words, No CaO existed on the surface of the catalyst carrier.

Then, aqueous solution of rhodium acetate containing Rh by 0.87 wt % was sprayed onto the obtained catalyst carrier by 0.15 cc (1.0 times of the water absorption of the catalyst carrier) relative to 1.0 g of the catalyst carrier to obtain an Rh-carrying catalyst carrier.

Thereafter, the obtained Rh-carrying catalyst carrier was dried in an oven arranged in the open air at 120° C. for 2.5 hours and additionally aqueous solution of chloroplatinic acid containing Pt by 0.5 wt % was sprayed by 0.15 cc (1.0 times of the water absorption of the catalyst carrier) relative to 1.0 g of the carrier to obtain a catalyst carrier carrying both Rh and Pt.

The obtained catalyst carrier that carried both Rh and Pt was baked in an electric furnace arranged in the open air at 950° C. for 2.0 hours to obtain a catalyst final product.

The obtained catalyst contained Rh and Pt at respective rates of 1,300 wtppm and 750 wtppm relative to the catalyst and its BET specific surface area was 0.20 m$^2$/g. The obtained catalyst was subjected to an EPMA analysis as in Example 1 to find that no Ca existed in the vicinity of Rh and Pt.

Comparative Reaction Example 11

50 cc of the catalyst prepared in Comparative Example 11 was filled in a reactor similar to the one used in Example 1 and a $CO_2$ reforming test of methane was conducted.

More specifically, to begin with, a reduction treatment was conducted by preliminarily causing mixture gas showing a molar ratio of $H_2$ to $H_2O$ of ($H_2/H_2O=1/3$) to flow through the catalyst layer at 500° C. for 1 hour so as to make it contact with the catalyst. Thereafter, source gas of $CH_4$:$CO_2$:$H_2O$ (molar ratio)=1:1:0 was treated under the conditions of gas pressure at the outlet of the catalyst layer of 1960 kPaG, gas temperature at the outlet of the catalyst layer of 880° C. and GHSV=2,500/hour using methane as reference. The $CH_4$ conversion 5 hours after the start of the reaction was 54.8% ($CH_4$ equilibrium conversion=54.8% under the experiment conditions) and the $CH_4$ conversion 15 hours after the start of the reaction was 54.8%. As in the case of Example 1, 15 hours after the start of the reaction, the catalyst was vertically divided into 4 pieces and drawn out to find that the carbon contents of the pieces were sequentially from above 1.6 wt %, 2.3 wt %, 3.2 wt % and 2.7 wt %. Additionally, the catalyst that had been treated under the above-described treatment conditions of Comparative Reaction Example 11 was analyzed as in the instance of Example 1 to confirm that Rh particles existed on the catalyst surface.

Comparative Example 12

MgO powder that contained CaO by not more than 0.001 wt % in terms of Ca and showed a purity of not less than 99.9 wt % was mixed with 3.0 wt % carbon, which operated as lubricant relative to the MgO powder, and the mixture was used to form a cylindrical pellet having a diameter of ¼ inches. Aqueous solution of lanthanum nitrate containing La by 5.1 wt % was sprayed onto the formed pellet to cause the pellet to carry La and the pellet was baked at 1,110° C. in air for 3 hours to obtain the catalyst carrier of this comparative example.

The obtained catalyst carrier was then analyzed by means of ICP as in Example 1 to find that the catalyst carrier contained La by 1.5 wt % and also contained CaO by not more than 0.001 wt % in terms of Ca. No precipitation of CaO on the surface of the obtained catalyst carrier was confirmed. In other words, No CaO existed on the surface of the catalyst carrier.

Then, aqueous solution of rhodium acetate containing Rh by 0.67 wt % was sprayed onto the obtained catalyst carrier by 0.20 cc (1.3 times of the water absorption of the catalyst carrier) relative to 1.0 g of the catalyst carrier to obtain an Rh-carrying catalyst carrier.

Thereafter, the obtained Rh-carrying catalyst carrier was dried in an oven arranged in the open air at 120° C. for 2.5 hours and baked in an electric furnace arranged in the open air at 950° C. for 2.0 hours to obtain a catalyst final product.

The obtained catalyst contained Rh at a rate of 1,300 wtppm relative to the catalyst and its BET specific surface area was 0.20 m$^2$/g. The obtained catalyst was subjected to an EPMA analysis as in Example 1 to find that neither Ca nor La existed in the vicinity of Rh.

Comparative Reaction Example 12

50 cc of the catalyst prepared in Comparative Example 12 was filled in a reactor similar to the one used in Example 1 and a $CO_2$ reforming test of methane was conducted.

More specifically, to begin with, a reduction treatment was conducted by preliminarily causing mixture gas showing a molar ratio of $H_2$ to $H_2O$ of ($H_2/H_2O=1/0$) to flow through the catalyst layer at 500° C. for 1 hour so as to make it contact with the catalyst. Thereafter, source gas of $CH_4$:$CO_2$:$H_2O$ (molar ratio)=1:1:0 was treated under the conditions of gas pressure at the outlet of the catalyst layer of 1960 kPaG, gas temperature at the outlet of the catalyst layer of 880° C. and GHSV=2,500/hour using methane as reference. The $CH_4$ conversion 5 hours after the start of the reaction was 54.8% ($CH_4$ equilibrium conversion=54.8% under the experiment conditions) and the $CH_4$ conversion 50 hours after the start of the reaction was 54.8%. As in the case of Example 1, 50 hours after the start of the reaction, the catalyst was vertically divided into 4 pieces and drawn out to find that the carbon contents of the pieces were sequentially from above 7.2 wt %, 5.1 wt %, 2.1 wt % and 1.2 wt %. Additionally, the catalyst that had been treated under the above-described treatment conditions of Comparative Reaction Example 12 was analyzed as in the instance of Example 1 to confirm that Rh particles existed on the catalyst surface.

Comparative Example 13

While MgO powder that contained CaO by not more than 0.001 wt % in terms of Ca and showed a purity of not less than 99.9 wt % was boiled at 1,000° C. and agitated to cause it to turn into Mg(OH)$_2$, aqueous solution of Ca (OH)$_2$ was dropped onto the reaction system and the mixture solution was agitated to obtain Ca-added type Mg(OH)$_2$ particles. Then, 3.0 wt % carbon, which operated as lubricant, was mixed with the added type particles and a cylindrical pellet having a diameter of ¼ inches was formed therefrom. The formed pellet was further baked in air at 1,180° C. for 3 hours to obtain a catalyst carrier.

The obtained catalyst carrier was then analyzed by means of ICP as in Example 1 to find that the catalyst carrier contained CaO by 1.8 wt %. As a result of an EPMA analysis, it was confirmed that no Ca existed in the inside of the catalyst carrier and Ca existed only on the surfaces of MgO grains. Additionally, the MgO grains comprised in the obtained catalyst carrier were remarkably larger than the Ca-added type Mg(OH)$_2$ particles. Therefore, it may be safe to say that the Ca-added type Mg(OH)$_2$ particles agglomerated to form MgO grains and the CaO contained in the Ca-added type Mg(OH)$_2$ particles precipitated on the surfaces of the MgO grains. The obtained catalyst carrier was granular as in Example 1 and part of the surface of MgO grain was covered by a CaO-containing layer while CaO existed in recesses on the surfaces of MgO grains. Additionally, CaO was found within 10% of the depth from the surface of the catalyst carrier. The abundance of CaO on the surface of MgO grain was determined to find that it was 180 mg-Ca/m$^2$-MgO in terms of Ca. Ca was contained in the center part of peanut shell-like grain only by a very small amount and Ca was mostly contained in the opposite end parts thereof.

Then, aqueous solution of rhodium acetate containing Rh by 0.87 wt % was sprayed onto the obtained catalyst carrier by 0.15 cc (1.0 times of the water absorption of the catalyst carrier) relative to 1.0 g of the catalyst carrier to obtain an Rh-carrying catalyst carrier.

Thereafter, the obtained Rh-carrying catalyst carrier was dried in an oven arranged in the open air at 120° C. for 2.5 hours and baked in an electric furnace arranged in the open air at 950° C. for 2.0 hours to obtain a catalyst final product.

The obtained catalyst contained Rh at a rate of 1,300 wtppm relative to the catalyst and its BET specific surface area was 0.10 m$^2$/g. The obtained catalyst was subjected to an EPMA analysis as in Example 1 to find that Rh was carried on the surfaces of the catalyst grains. Rh existed within 10% of the depth from the catalyst surface. Besides, CaO existed in the vicinity of Rh. The abundance of CaO on the surface of MgO grain was determined to find that it was 180 mg-Ca/m$^2$-MgO in terms of Ca. Ru and CaO contained in the catalyst carrier all existed on the surfaces of MgO grains. Ca was contained in the center part of peanut shell-like grain only by a very small amount and Ca was mostly contained in the opposite end parts thereof.

Comparative Reaction Example 13

50 cc of the catalyst prepared in Comparative Example 13 was filled in a reactor similar to the one used in Example 1 and a CO$_2$ reforming test of methane was conducted.

More specifically, to begin with, a reduction treatment was conducted by preliminarily causing mixture gas showing a molar ratio of H$_2$ to H$_2$O of (H$_2$/H$_2$O=1/0) to flow through the catalyst layer at 500° C. for 1 hour so as to make it contact with the catalyst. Thereafter, source gas of CH$_4$:CO$_2$:H$_2$O (molar ratio)=1:1:0 was treated under the conditions of gas pressure at the outlet of the catalyst layer of 1960 kPaG, gas temperature at the outlet of the catalyst layer of 880° C. and GHSV=2,500/hour using methane as reference. The CH$_4$ conversion 5 hours after the start of the reaction was 53.9% (CH$_4$ equilibrium conversion=54.8% under the experiment conditions) and the CH$_4$ conversion 50 hours after the start of the reaction was 53.1%. As in the case of Example 1, 50 hours after the start of the reaction, the catalyst was vertically divided into 4 pieces and drawn out to find that the carbon contents of the pieces were sequentially from above 0.6 wt %, 0.4 wt %, 0.1 wt % and 0.05 wt %. Additionally, the catalyst that had been treated under the above-described treatment conditions of Comparative Reaction Example 13 was analyzed as in the instance of Example 1 to confirm that Rh particles existed on the catalyst surface.

Comparative Example 14

While MgO powder that contained CaO by not more than 0.001 wt % in terms of Ca and showed a purity of not less than 99.9 wt % was boiled at 100° C. and agitated to cause it to turn into Mg(OH)$_2$, aqueous solution of Ca (OH)$_2$ was dropped onto the reaction system and the mixture solution was agitated to obtain Ca-added type Mg(OH)$_2$ particles. Then, 3.0 wt % carbon, which operated as lubricant, was added to the added type particles and a pellet having a diameter of ¼ inches was formed therefrom. The formed pellet was further baked in air at 1,060° C. for 3 hours to obtain a catalyst carrier.

The obtained catalyst carrier was then analyzed by means of ICP as in Example 1 to find that the catalyst carrier contained CaO by 0.001 wt % in terms of Ca. As a result of an EPMA analysis, it was confirmed that no Ca existed in the inside of the catalyst carrier and Ca existed only on the surfaces of MgO grains. Additionally, the MgO grains comprised in the obtained catalyst carrier were remarkably larger than the Ca-added type Mg(OH)$_2$ particles. Therefore, it may be safe to say that the Ca-added type Mg(OH)$_2$ particles agglomerated to form MgO grains and the CaO contained in the Ca-added type Mg(OH)$_2$ particles precipitated on the surfaces of the MgO grains. The obtained catalyst carrier was granular as in Example 1 and part of the surface of MgO grain was covered by a CaO-containing layer while CaO existed in recesses on the surfaces of MgO grains. Additionally, CaO was found within 10% of the depth from the surface of the catalyst carrier. The abundance of CaO on the surface of MgO grain was determined to find that it was 0.02 mg-Ca/m$^2$-MgO in terms of Ca. Ca was contained in the center part of peanut shell-like grain only by a very small amount and Ca was mostly contained in the opposite end parts thereof.

Then, aqueous solution of ruthenium nitrate containing Rh by 0.7 wt % was sprayed onto the obtained catalyst carrier by 0.15 cc (1.0 times of the water absorption of the catalyst carrier) relative to 1.0 g of the catalyst carrier to obtain an Ru-carrying catalyst carrier.

Thereafter, the obtained Ru-carrying catalyst carrier was dried in an oven arranged in the open air at 120° C. for 2.5 hours and subsequently baked in an electric furnace arranged in the open air at 400° C. for 2.0 hours to obtain a catalyst final product.

The obtained catalyst contained Ru at a rate of 910 wtppm relative to the catalyst and its BET specific surface area was 0.50 m$^2$/g. The obtained catalyst was subjected to an EPMA analysis as in Example 1 to find that Ru was carried on the surfaces of the catalyst grains. Ru existed within 10% of the depth from the catalyst surface. Besides, CaO existed in the vicinity of Ru.

Comparative Reaction Example 14

50 cc of the catalyst prepared in Comparative Example 14 was filled in a reactor similar to the one used in Example 1 and a CO$_2$ reforming test of methane was conducted.

More specifically, to begin with, a reduction treatment was conducted by preliminarily causing mixture gas showing a molar ratio of H$_2$ to H$_2$O of (H$_2$/H$_2$O=1/0) to flow through the catalyst layer at 500° C. for 1 hour so as to make it contact with the catalyst. Thereafter, source gas of CH$_4$:CO$_2$:H$_2$O (molar ratio)=1:1:0 was treated under the conditions of gas pressure at the outlet of the catalyst layer of 1960 kPaG, gas temperature at the outlet of the catalyst layer of 880° C. and GHSV=2,500/hour using methane as reference. The CH$_4$ conversion 5 hours after the start of the reaction was 53.9% (CH$_4$ equilibrium conversion=54.8% under the experiment conditions) and the CH$_4$ conversion 50 hours after the start of the reaction was 53.3%. As in the case of Example 1, 50 hours after the start of the reaction, the catalyst was vertically divided into 4 pieces and drawn out to find that the carbon contents of the pieces were sequentially from above 0.5 wt %, 0.5 wt %, 0.1 wt % and 0.05 wt %. Additionally, the catalyst that had been treated under the above-described treatment conditions of Comparative Reaction Example 14 was analyzed as in the instance of Example 1 to confirm that Rh particles existed on the catalyst surface.

Table 3 shows the conditions under which the catalyst carriers of Examples 1 through 10 and Comparative Examples 1 through 14 were prepared and also the properties of the obtained carriers and those of the obtained catalysts. Table 4 shows the conditions and the results of the reforming tests of Reaction Examples 1 through 10 and Comparative Reaction Examples 1 through 14.

As shown in Tables 3 and 4, the carbon depositions were remarkably small in the CO$_2$ reforming reactions using the catalysts of Examples 1 through 10 of the present inventions. Additionally, in each of Examples 1 through 10, the initial methane conversion was maintained after a long ventilation time. In other words, the catalyst operated efficiently for producing synthesis gas on a stable basis for a long duration of time.

To the contrary, carbon deposited remarkably in a short period of time in Comparative Examples 1, 3 and 4 where neither Rh nor Ru was caused to be carried, in Comparative Example 2 where the baking temperature was low and CaO did not precipitate on the surfaces of MgO grains, in Comparative Examples 5 through 9 where the carriers did not contain MgO and in Comparative Examples 10 through 14 where the CaO contents were out of the range defined for the purpose of the present invention. Additionally, the conversions of Comparative Examples 1 and 3 through 8 were lower than those of Examples 1 through 10.

TABLE 3

| | Carrier | | | | | Catalyst | | |
|---|---|---|---|---|---|---|---|---|
| | carrier metal | *2 wt % | baking time hr | baking temp °C. | *3 wt % | *4 mg-Ca/ m²-MgO | carrier metal | metal source | carrier solution |
| Example 1 | MgO | 0.3 | 3 | 1180 | 0.3 | 30 | Ru | Ru nitrosyl nitrate | H₂O |
| Example 2 | MgO | 0.3 | 3 | 1180 | 0.3 | 30 | Ru | Ru chloride | H₂O |
| Example 3 | MgO | 0.3 | 3 | 1180 | 0.3 | 30 | Ru | Ru nitrate | H₂O |
| Example 4 | MgO | 0.3 | 3 | 1150 | 0.3 | 25 | Rh | Rh acetate | H₂O |
| Example 5 | MgO | 0.3 | 3 | 1200 | 0.3 | 37.5 | Ru | Ru nitrosyl nitrate | H₂O |
| Example 6 | MgO | 0.3 | 3 | 1130 | 0.3 | 20 | Ru | Ru nitrate | H₂O |
| Example 7 | MgO | 0.5 *1 | 3 | 1180 | 0.5 | 50 | Ru | Ru nitrate | H₂O |
| Example 8 | MgO | 1.4 *1 | 3 | 1180 | 1.4 | 140 | Ru | Ru nitrate | H₂O |
| Example 9 | MgO | 0.3 | 3 | 1150 | 0.3 | 25 | Rh | Rh acetate | H₂O |
| Example 10 | MgO | 0.01*1 | 3 | 1180 | 0.01 | 1 | Ru | Ru nitrate | H₂O |
| Comp ex 1 | MgO | 0.3 | 3 | 1100 | 0.3 | 15 | Ni | Ni nitrate | H₂O |
| Comp ex 2 | MgO | 0.3 | 3 | 600 | 0.3 | 0 | Rh | Rh acetate | H₂O |
| Comp ex 3 | MgO | 0.3 | 3 | 1100 | 0.3 | 15 | Ir | Ir chloride | H₂O |
| Comp ex 4 | MgO | 0.3 | 3 | 1100 | 0.3 | 15 | Os | Os oxide | H₂O |
| Comp ex 5 | SiO₂/Al₂O₃ | 0.01≥ | 3 | 950 | 0.01≥ | 0 | Rh | Rh acetate | H₂O |
| Comp ex 6 | ZnO | 0.01≥ | 3 | 950 | 0.01≥ | 0 | Rh | Rh acetate | H₂O |
| Comp ex 7 | CaO | 100 | 3 | 950 | 100 | — | Rh | Rh acetate | H₂O |
| Comp ex 8 | ZrO₂ | 0.01≥ | 3 | 950 | 0.01≥ | 0 | Rh | Rh acetate | H₂O |
| Comp ex 9 | Al₂O₃ | 0.01≥ | 3 | 950 | 0.01≥ | 0 | Rh | Rh acetate | H₂O |
| Comp ex 10 | MgO | 0.001≥ | 3 | 1100 | 0.001≥ | 0 | Rh | Rh acetate | H₂O |
| Comp ex 11 | MgO | 0.001≥ | 3 | 1100 | 0.001≥ | 0 | Rh/Pt | Rh acetate chloroplatinic acid | H₂O |
| Comp ex 12 | MgO | 0.001≥ | 3 | 1100 | 0.001≥ (La = 1.5) | 0 | Rh | Rh acetate | H₂O |
| Comp ex 13 | MgO | 1.8 *1 | 3 | 1180 | 1.8 | 180 | Rh | Rh acetate | H₂O |
| Comp ex 14 | MgO | 0.001 *1 | 3 | 1060 | 0.001 | 0.02 | Ru | Ru nitrate | H₂O |

| | Catalyst | | | | | | | | |
|---|---|---|---|---|---|---|---|---|---|
| | carrying method | drying temp °C. | drying time hr | baking time hr | baking temp °C. | gas used | aqueous solution conc wt %. | catalyst metal conc wt-ppm | catalyst spec. surf. area m²/g |
| Example 1 | spray | 120 | 2.5 | 2 | 400 | air | 0.5 | 750 | 0.10 |
| Example 2 | spray | 120 | 2.5 | 2 | 400 | air | 0.55 | 900 | 0.10 |
| Example 3 | spray | 120 | 2.5 | 2 | 400 | air | 0.17 | 300 | 0.10 |
| Example 4 | spray | 120 | 2.5 | 2 | 650 | air | 0.3 | 450 | 0.12 |
| Example 5 | spray | 120 | 2.5 | 2 | 400 | air | 0.85 | 1100 | 0.08 |
| Example 6 | spray | 120 | 2.5 | 2 | 400 | air | 0.6 | 780 | 0.15 |
| Example 7 | spray | 120 | 2.5 | 2 | 400 | air | 0.8 | 1000 | 0.10 |
| Example 8 | spray | 120 | 2.5 | 2 | 400 | air | 0.7 | 910 | 0.10 |
| Example 9 | spray | 120 | 2.5 | 2 | 650 | air | 0.81 | 1350 | 0.12 |
| Example 10 | spray | 120 | 2.5 | 2 | 400 | air | 0.6 | 780 | 0.10 |
| Comp ex 1 | spray | 120 | 2.5 | 2 | 650 | air | 8.0 | 10000 | 0.20 |
| Comp ex 2 | spray | 120 | 2.5 | 2 | 950 | air | 3.9 | 15000 | 32.0 |
| Comp ex 3 | spray | 120 | 2.5 | 2 | 650 | air | 2.7 | 3500 | 0.20 |
| Comp ex 4 | spray | 120 | 2.5 | 2 | 650 | air | 1.6 | 3500 | 0.20 |
| Comp ex 5 | spray | 120 | 2.5 | 2 | 950 | air | 0.48 | 850 | 24.0 |
| Comp ex 6 | spray | 120 | 2.5 | 2 | 950 | air | 0.37 | 900 | 1.50 |
| Comp ex 7 | spray | 120 | 2.5 | 2 | 950 | air | 0.3 | 780 | 8.90 |
| Comp ex 8 | spray | 120 | 2.5 | 2 | 950 | air | 0.28 | 900 | 4.20 |
| Comp ex 9 | spray | 120 | 2.5 | 2 | 950 | air | 0.16 | 1200 | 110.0 |
| Comp ex 10 | spray | 120 | 2.5 | 2 | 950 | air | 0.73 | 1300 | 0.20 |
| Comp ex 11 | spray | 120 | 2.5 | 2 | 950 | air | 0.87 0.5 | 1300 750 | 0.20 |
| Comp ex 12 | spray | 120 | 2.5 | 2 | 950 | air | 0.67 | 1300 | 0.20 |
| Comp ex 13 | spray | 120 | 2.5 | 2 | 950 | air | 0.87 | 1300 | 0.10 |
| Comp ex 14 | spray | 120 | 2.5 | 2 | 400 | air | 0.7 | 910 | 0.50 |

*1: Content of CaO contained in obtained Ca-added Mg(OH)₂ grains
*2: CaO content in source MgO (in terms of Ca)

TABLE 3-continued

*3: CaO content in carrier (in terms of Ca),
*4: CaO concentration per unit surface area of MgO grains (in terms of Ca)

TABLE 4

| | Catalyst | Reaction temp ° C. | GHSV 1/hr | Reaction pressure kPaG | $CO_2/CH_4/H_2O$ mol | $CH_4$ conversion *1 % |
|---|---|---|---|---|---|---|
| Reaction ex 1 | Example 1 | 850 | 2,500 | 1471 | 2.5/1/1.5 | 92.5 |
| Reaction ex 2 | Example 2 | 850 | 2,500 | 1960 | 1/1/0 | 54.8 |
| Reaction ex 3 | Example 3 | 900 | 2,500 | 1471 | 3/1/0.3 | 97.0 |
| Reaction ex 4 | Example 4 | 850 | 2,500 | 1960 | 1/1/0 | 54.8 |
| Reaction ex 5 | Example 5 | 880 | 2,500 | 1960 | 1/1/0 | 54.8 |
| Reaction ex 6 | Example 6 | 880 | 2,500 | 1960 | 0.4/1/1 | 66.7 |
| Reaction ex 7 | Example 7 | 880 | 2,500 | 1960 | 0.4/1/1 | 66.7 |
| Reaction ex 8 | Example 8 | 880 | 2,500 | 1960 | 0.4/1/1 | 66.7 |
| Reaction ex 9 | Example 9 | 880 | 2,500 | 1960 | 0.4/1/1 | 66.7 |
| Reaction ex 10 | Example 10 | 880 | 2,500 | 1960 | 0.4/1/1 | 66.7 |
| Comp reac ex 1 | Comp ex 1 | 880 | 2,500 | 1960 | 1/1/0 | 15.3 |
| Comp reac ex 2 | Comp ex 2 | 880 | 2,500 | 1960 | 1/1/0 | 54.8 |
| Comp reac ex 3 | Comp ex 3 | 880 | 2,500 | 1960 | 1/1/0 | 45.3 |
| Comp reac ex 4 | Comp ex 4 | 880 | 2,500 | 1960 | 1/1/0 | 6.3 |
| Comp reac ex 5 | Comp ex 5 | 880 | 2,500 | 1960 | 1/1/0 | 35.3 |
| Comp reac ex 6 | Comp ex 6 | 880 | 2,500 | 1960 | 1/1/0 | 15.8 |
| Comp reac ex 7 | Comp ex 7 | 880 | 2,500 | 1960 | 1/1/0 | 25.3 |
| Comp reac ex 8 | Comp ex 8 | 880 | 2,500 | 1960 | 1/1/0 | 37.8 |
| Comp reac ex 9 | Comp ex 9 | 880 | 2,500 | 1960 | 1/1/0 | 54.8 |
| Comp reac ex 10 | Comp ex 10 | 880 | 2,500 | 1960 | 1/1/0 | 54.8 |
| Comp reac ex 11 | Comp ex 11 | 880 | 2,500 | 1960 | 1/1/0 | 54.8 |
| Comp reac ex 12 | Comp ex 12 | 880 | 2,500 | 1960 | 1/1/0 | 54.8 |
| Comp reac ex 13 | Comp ex 13 | 880 | 2,500 | 1960 | 1/1/0 | 53.9 |
| Comp reac ex. 14 | Comp ex 14 | 880 | 2,500 | 1960 | 1/1/0 | 53.9 |

| | $CH_4$ conversion *2 % | $CH_4$ equilibrium conversion % | Gas passage time hrs | C Top wt % | C Md1 wt % | C Md2 wt % | C Btm wt % |
|---|---|---|---|---|---|---|---|
| Reaction ex 1 | 92.5 | 92.5 | 1500 | 0.2 | 0.15 | 0.1 | 0.1 |
| Reaction ex 2 | 53.1 | 54.8 | 1100 | 0.25 | 0.1 | 0.1 | 0.04 |
| Reaction ex 3 | 97.0 | 97.0 | 15000 | 0.2 | 0.05 | 0.03 | 0.02 |
| Reaction ex 4 | 52.3 | 54.8 | 800 | 0.15 | 0.1 | 0.05 | 0.03 |
| Reaction ex 5 | 53.5 | 54.8 | 700 | 0.15 | 0.04 | 0.03 | 0.01 |
| Reaction ex 6 | 66.7 | 66.7 | 13000 | 0.11 | 0.05 | 0.03 | 0.01 |
| Reaction ex 7 | 66.7 | 66.7 | 13000 | 0.15 | 0.08 | 0.05 | 0.01 |
| Reaction ex 8 | 66.7 | 66.7 | 9000 | 0.21 | 0.15 | 0.08 | 0.01 |
| Reaction ex 9 | 66.7 | 66.7 | 8000 | 0.15 | 0.07 | 0.05 | 0.01 |
| Reaction ex 10 | 66.7 | 66.7 | 5000 | 0.28 | 0.17 | 0.09 | 0.01 |
| Comp reac ex 1 | — | 54.8 | 5 | 3.1 | 2.3 | 3.3 | 2.8 |
| Comp reac ex 2 | 47.3 | 54.8 | 30 | 3.1 | 2.3 | 2.2 | 2.1 |
| Comp reac ex 3 | 38.2 | 54.8 | 50 | 0.8 | 0.5 | 0.3 | 0.4 |
| Comp reac ex 4 | 3.5 | 54.8 | 20 | 28.7 | 12.3 | 8.5 | 7.8 |
| Comp reac ex 5 | 28.2 | 54.8 | 20 | 1.8 | 1.3 | 0.8 | 0.5 |
| Comp reac ex 6 | 10.2 | 54.8 | 40 | 5.5 | 5.1 | 3.2 | 2.1 |
| Comp reac ex 7 | 18.2 | 54.8 | 70 | 17.4 | 10.3 | 5.1 | 4.7 |
| Comp reac ex 8 | 30.2 | 54.8 | 10 | 1.5 | 2.3 | 3.2 | 3.2 |
| Comp reac ex 9 | 51.2 | 54.8 | 50 | 16.1 | 10.3 | 5.2 | 4.8 |
| Comp reac ex 10 | 52.3 | 54.8 | 70 | 6.5 | 3.5 | 3.2 | 2.4 |
| Comp reac ex 11 | 54.8 | 54.8 | 15 | 1.6 | 2.3 | 3.2 | 2.7 |
| Comp reac ex 12 | 54.8 | 54.8 | 50 | 7.2 | 5.1 | 2.1 | 1.2 |
| Comp reac ex 13 | 53.1 | 54.8 | 50 | 0.6 | 0.4 | 0.1 | 0.05 |
| Comp reac ex. 14 | 53.3 | 54.8 | 50 | 0.5 | 0.5 | 0.1 | 0.05 |

*1: $CH_4$ conversion 5 hours after start of reaction
*2: $CH_4$ conversion after elapse of time described in column "gas passage time"

This application claims the benefit of Japanese Patent Application No. 2016-116202, filed Jun. 10, 2016, which is hereby incorporated by reference herein in its entirety.

REFERENCE SIGNS LIST

10: carrier for synthesis gas production catalyst
11: magnesium oxide grain
12, 13: calcium oxide-containing layer

The invention claimed is:
1. A synthesis gas production catalyst to be used for producing synthesis gas containing carbon monoxide and hydrogen from source gas containing methane-containing light hydrocarbons and carbon dioxide, wherein the catalyst comprises at least either one of the metals of ruthenium and rhodium carried on a carrier which contains magnesium oxide grains and calcium oxide existing on the surfaces of the magnesium oxide grains and shows a calcium oxide content between 0.005 mass % and 1.5 mass % in terms of Ca, and wherein the calcium oxide exists on the surfaces of the magnesium oxide grains by 0.05 mg-Ca/m²-MgO to 150 mg-Ca/m²-MgO in terms of Ca.

2. The synthesis gas production catalyst according to claim 1, wherein the calcium oxide exists within 10% of the depth from the surface of the carrier.

3. The synthesis gas production catalyst according to claim 1, wherein the magnesium oxide grains have a calcium oxide-containing layer formed on the surfaces thereof.

4. The synthesis gas production catalyst according to claim 1, wherein the metal is carried by the carrier within a range between 200 mass ppm and 2,000 mass ppm relative to the carrier in terms of metal.

5. The synthesis gas production catalyst according to claim 1, wherein the metal exists in the vicinity of the calcium oxide on the surfaces of the magnesium oxide grains.

6. The synthesis gas production catalyst according to claim 1, wherein the metal exists within 10% of the depth from the surface of the synthesis gas production catalyst.

7. The synthesis gas production catalyst according to claim 1, wherein the specific surface area of the synthesis gas production catalyst is between 0.1 m²/g and 1.0 m²/g.

8. The synthesis gas production catalyst according to claim 1, wherein the magnesium oxide grains have a calcium oxide-containing layer containing calcium oxide and a metal-containing layer containing the metal on the surfaces thereof.

9. The synthesis gas production catalyst according to claim 1, wherein metal particles containing the metal exist on the surfaces of the magnesium oxide grains.

* * * * *